United States Patent
Jung et al.

(10) Patent No.: US 10,381,680 B2
(45) Date of Patent: Aug. 13, 2019

(54) LITHIUM-SULFUR BATTERY

(71) Applicant: KOREA UNIVERSITY OF TECHNOLOGY AND EDUCATION INDUSTRY-UNIVERSITY COOPERATION FOUNDATION, Chungcheongnam-do (KR)

(72) Inventors: Yong Ju Jung, Daejeon (KR); Jeong Yoon Koh, Jeollabuk-do (KR)

(73) Assignee: J-INNOTECH CO., LTD, Asan-si (KR)

( * ) Notice: Subject to any disclaimer, the term of this patent is extended or adjusted under 35 U.S.C. 154(b) by 59 days.

(21) Appl. No.: 15/526,047

(22) PCT Filed: Nov. 12, 2015

(86) PCT No.: PCT/KR2015/012152
§ 371 (c)(1),
(2) Date: May 11, 2017

(87) PCT Pub. No.: WO2016/076636
PCT Pub. Date: May 19, 2016

(65) Prior Publication Data
US 2017/0309949 A1    Oct. 26, 2017

(30) Foreign Application Priority Data

Nov. 12, 2014  (KR) .................. 10-2014-0157102
Nov. 12, 2014  (KR) .................. 10-2014-0157103
Nov. 12, 2014  (KR) .................. 10-2014-0157161

(51) Int. Cl.
*H01M 10/05*     (2010.01)
*H01M 4/58*      (2010.01)
(Continued)

(52) U.S. Cl.
CPC ........... *H01M 10/05* (2013.01); *H01M 2/168* (2013.01); *H01M 2/1646* (2013.01);
(Continued)

(58) Field of Classification Search
None
See application file for complete search history.

(56) References Cited

U.S. PATENT DOCUMENTS

2013/0122334 A1* 5/2013 Visco ............... H01M 4/38
                                                    429/72
2013/0164635 A1* 6/2013 Schmidt ........... H01M 4/136
                                                    429/337

(Continued)

FOREIGN PATENT DOCUMENTS

JP    2010-257689 A    11/2010
KR   2005-0052258 A     6/2005
(Continued)

OTHER PUBLICATIONS

KR1020140034087 English translation. Sun et al. Korea. Mar. 19, 2014 (Year: 2014).*
(Continued)

*Primary Examiner* — Christopher P Domone
(74) *Attorney, Agent, or Firm* — Osha Liang LLP

(57) ABSTRACT

The present invention provides: i) a lithium-sulfur battery in which solid sulfur is introduced into an electrolytic region between a positive electrode and a negative electrode; ii) a lithium-sulfur battery comprising a middle layer containing elemental sulfur ($S_8$) or lithium sulfide ($Li_2S$) in an electrolytic region between a positive electrode and a negative electrode; and iii) a lithium-sulfur battery having a separator supporting sulfur particles or lithium sulfide particles between a positive electrode and a negative electrode.

14 Claims, 14 Drawing Sheets

(51) Int. Cl.
  *H01M 4/133* (2010.01)
  *H01M 2/16* (2006.01)
  *H01M 10/0562* (2010.01)
  *H01M 4/36* (2006.01)
  *H01M 4/38* (2006.01)
  *H01M 4/62* (2006.01)
  *H01M 10/052* (2010.01)

(52) U.S. Cl.
  CPC ......... *H01M 2/1653* (2013.01); *H01M 4/133* (2013.01); *H01M 4/364* (2013.01); *H01M 4/38* (2013.01); *H01M 4/382* (2013.01); *H01M 4/5815* (2013.01); *H01M 4/625* (2013.01); *H01M 10/052* (2013.01); *H01M 10/0562* (2013.01)

(56) References Cited

U.S. PATENT DOCUMENTS

| 2014/0217992 | A1* | 8/2014 | Li | H01M 2/1646 320/148 |
| 2015/0104690 | A1* | 4/2015 | Xiao | H01M 2/145 429/145 |

FOREIGN PATENT DOCUMENTS

| KR | 20120103378 A | | 9/2012 |
| KR | 2013-0088426 A | | 8/2013 |
| KR | 20140034087 A | | 3/2014 |
| KR | 1020140034087 | * | 3/2014 |

OTHER PUBLICATIONS

International Search Report issued in PCT/KR2015/012152 dated Feb. 29, 2016 (7 pages).
Written Opinion of the International Searching Authority issued in PCT/KR2015/012152 dated Feb. 29, 2016 (8 pages).
Korean Office Action in corresponding Application No. 10-2014-0157102 dated Mar. 29, 2016 (9 pages).
Ji, Xiulei et al.; "A highly ordered nanostructured carbon-sulphur cathode for lithium-sulphur batteries"; Nature Materials, vol. 8, Jun. 2009, pp. 500-506 (7 pages).
Zheng, G. et al.; "Hollow Carbon Nanofiber-Encapsulated Sulfur Cathodes for High Specific Capacity Rechargeable Lithium Batteries"; Nano Letters, vol. 11, Sep. 14, 2011, pp. 4462-4467 (6 pages).
Yang, Y. et al.; "New Nanostructured Li2S/Silicon Rechargeable Battery with High Specific Energy"; Nano Letters, vol. 10, 2010, pp. 1486-1491 (6 pages).
Yang, Y. et al.; "High-Capacity Micrometer-Sized Li2S Particles as Cathode Materials for Advanced Rechargeable Lithium-Ion Batteries"; Journal of the American Chemical Society, vol. 134, Aug. 21, 2012, pp. 15387-15394 (8 pages).
Cai, K. et al.; "Nanostructured Li2S-C Composites as Cathode Material for High-Energy Lithium/Sulfur Batteries"; Nano Letters, vol. 12, Nov. 28, 2012, pp. 6474-6479 (6 pages).
Koh, J.Y. et al.; "Electrochemical Reduction Mechanism of Sulfur Particles Electrically Isolated from Carbon Cathodes of Lithium-Sulfur Cells"; Journal of the Electrochemical Society, vol. 161, issue 14, Oct. 7, 2014, pp. A2117-A2120 (4 pages).
Koh, J.Y. et al.; "Understanding of Electrochemical Oxidation Route of Electrically Isolated Li2S Particles"; Journal of The Electrochemical Society, vol. 161, issue 14, Oct. 14, 2014, pp. A2133-A2137 (5 pages).

* cited by examiner

[FIG 1]
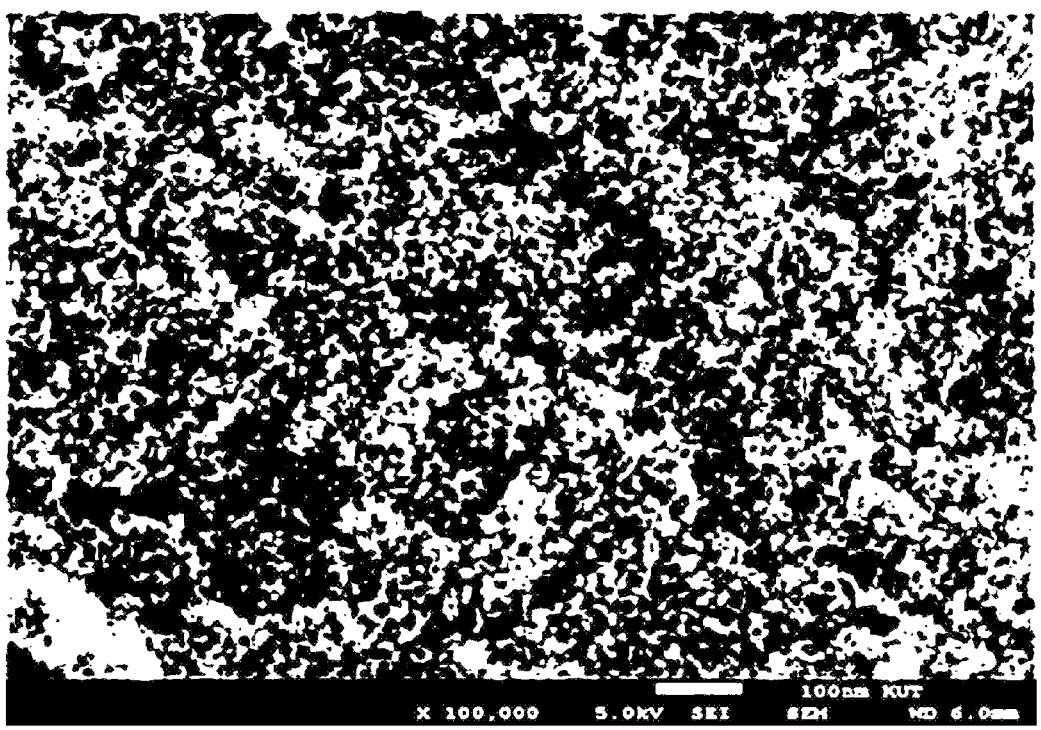

[FIG 2]
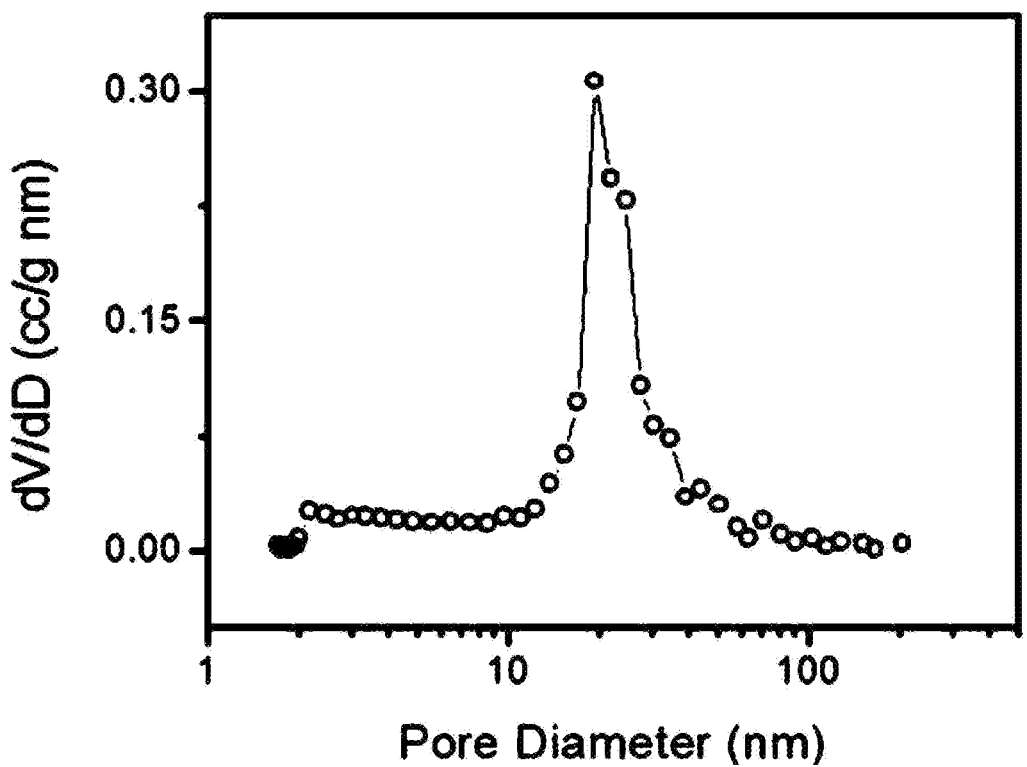
[FIG 3]
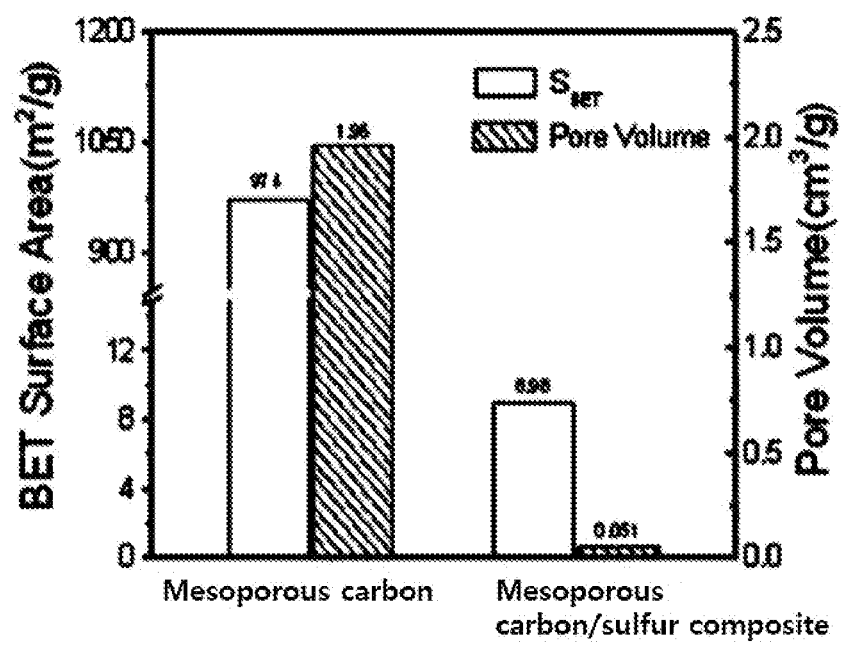

[FIG 4]
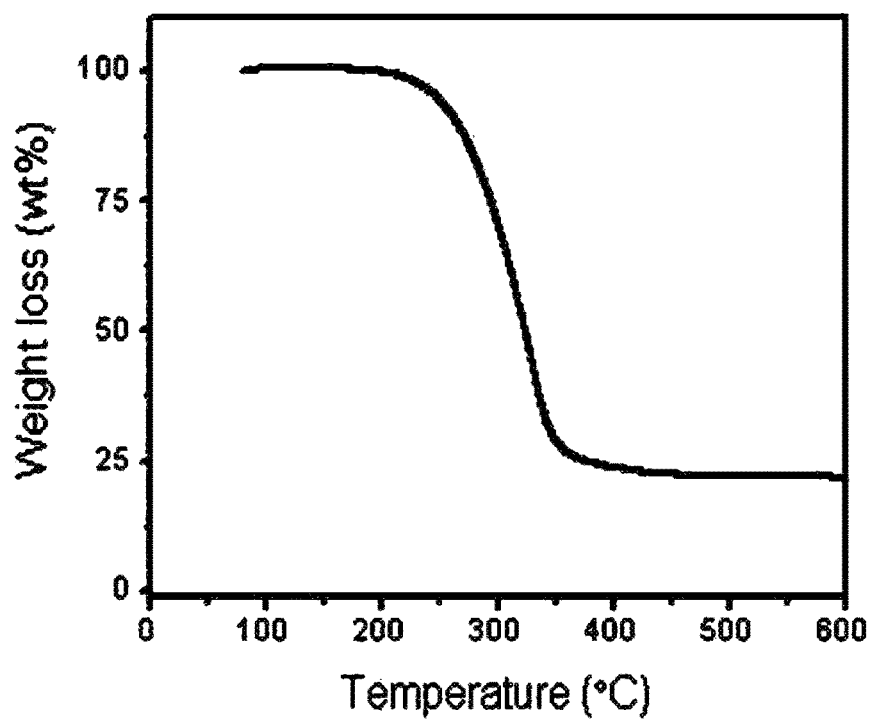
[FIG 5]
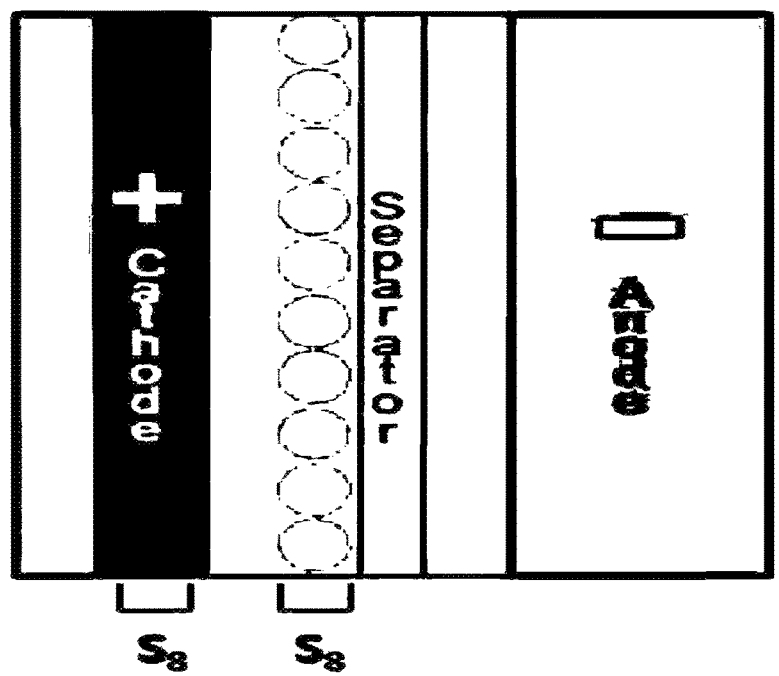

[FIG 6]
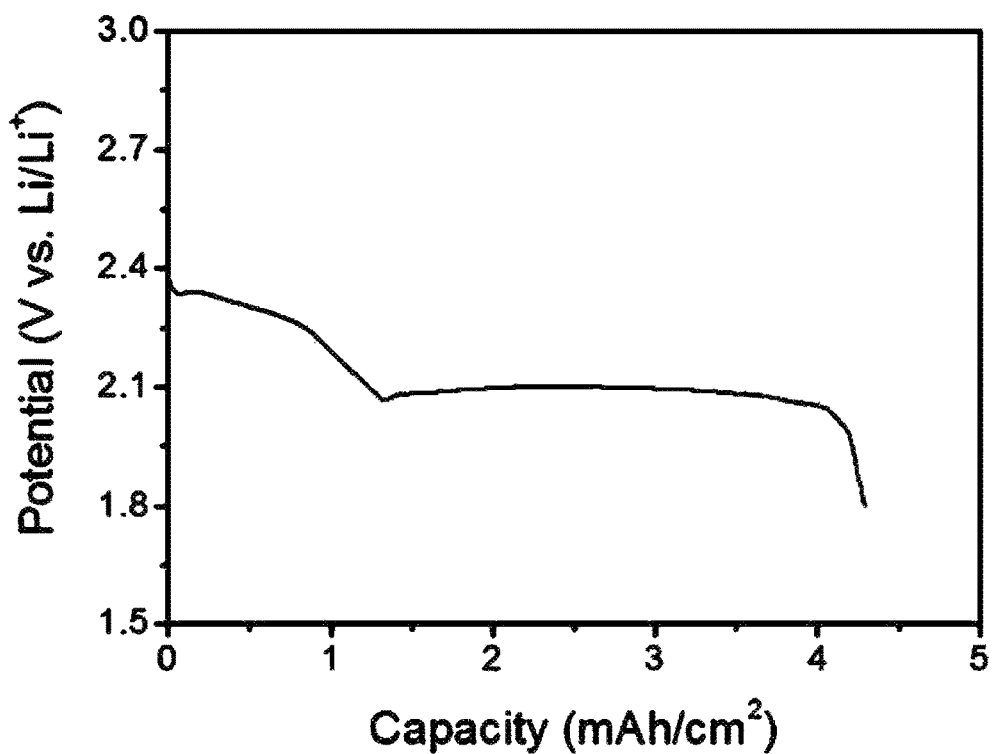
[FIG 7]
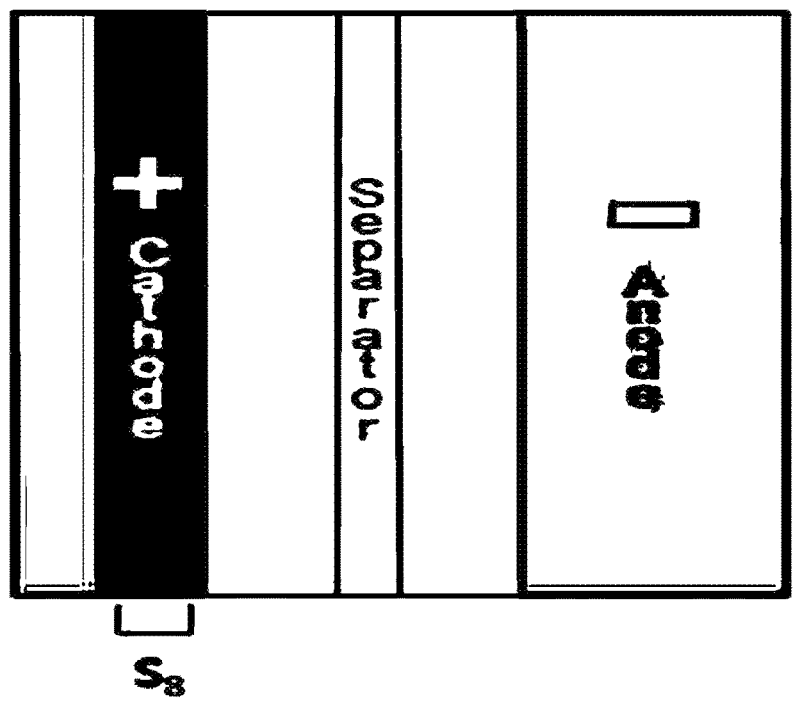

[FIG 8]
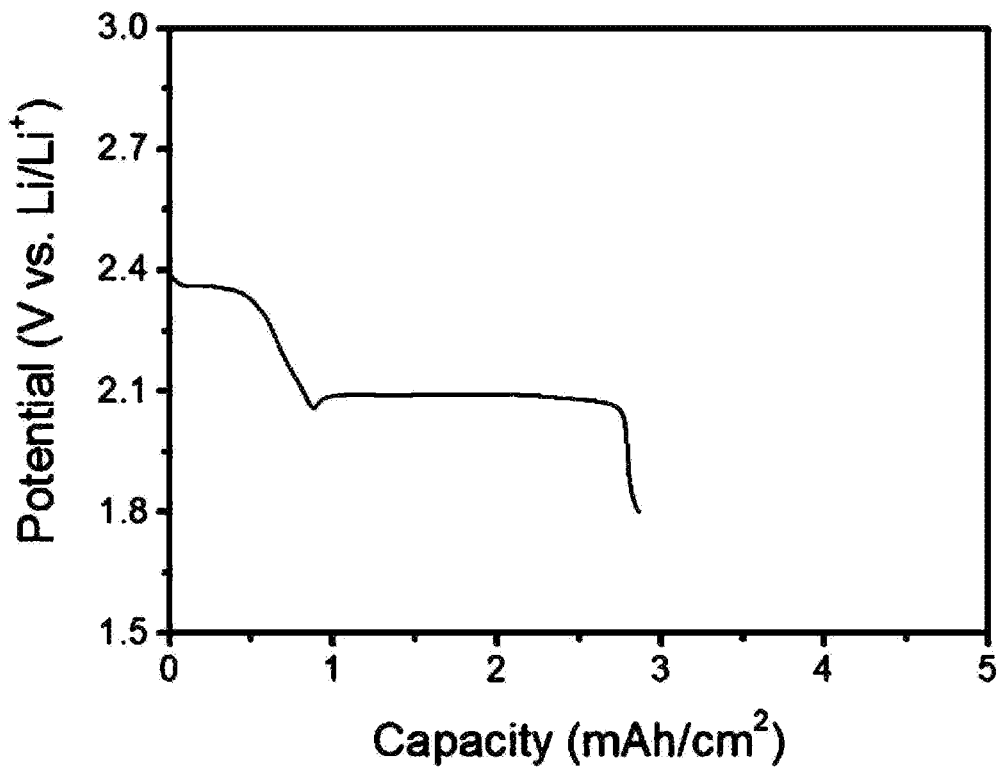
[FIG 9]
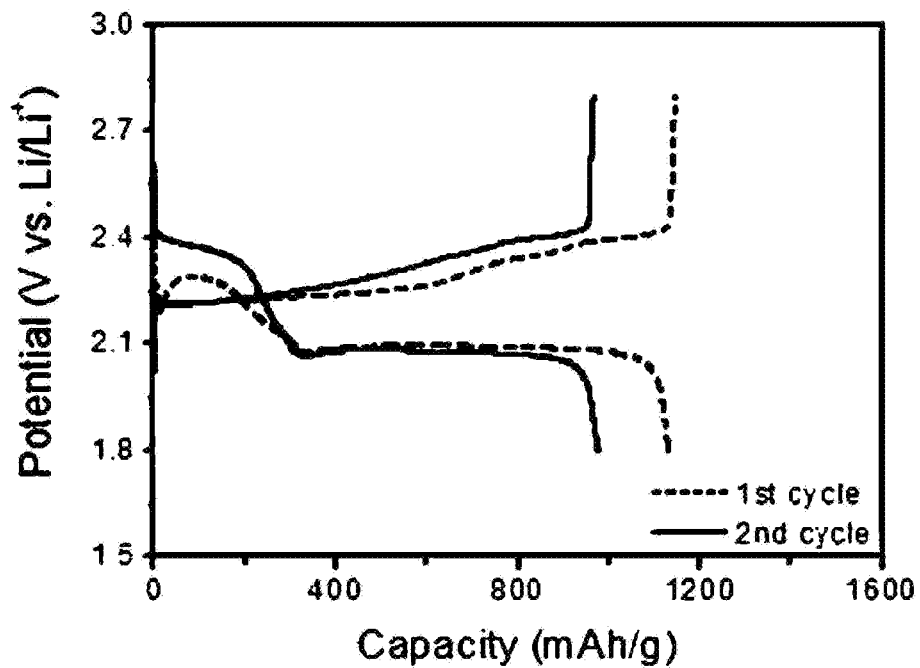

[FIG 10]
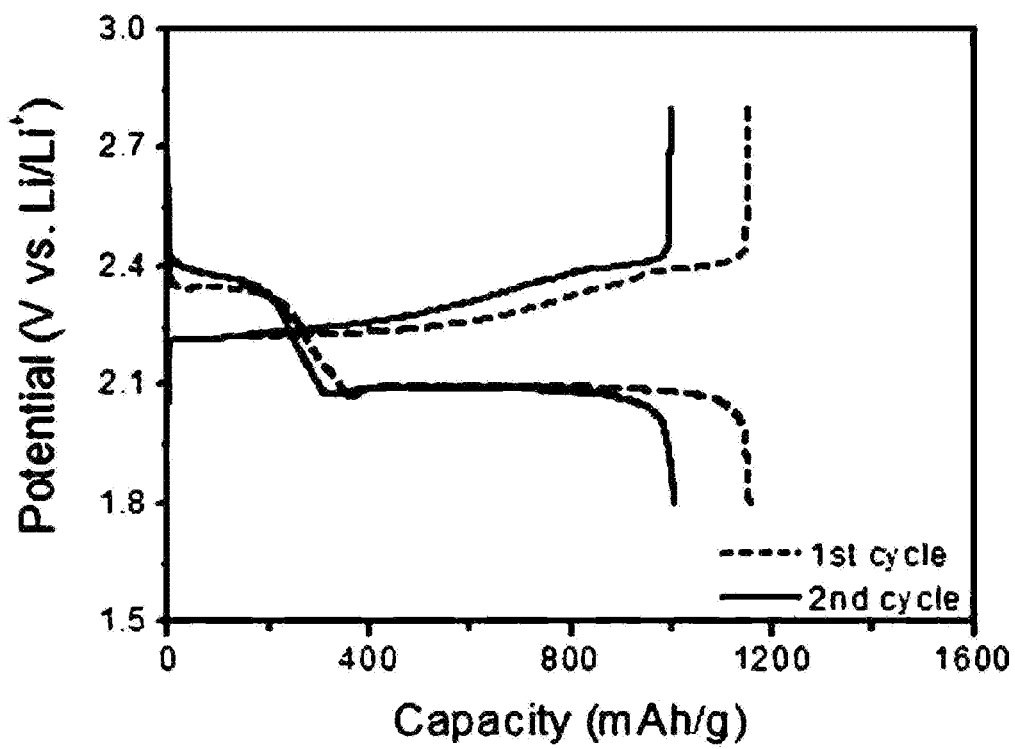
[FIG 11]
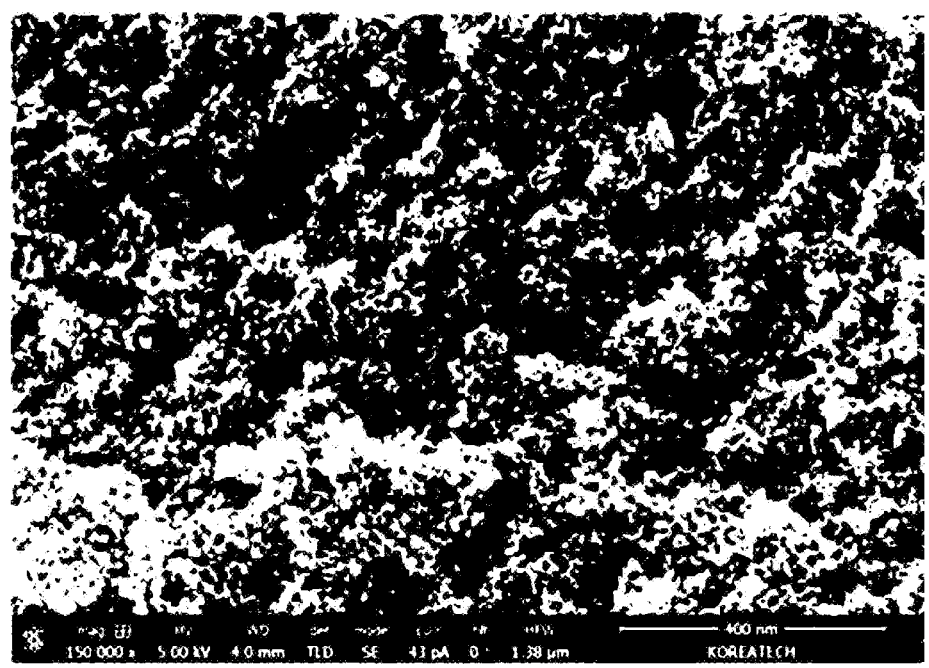

[FIG 12]
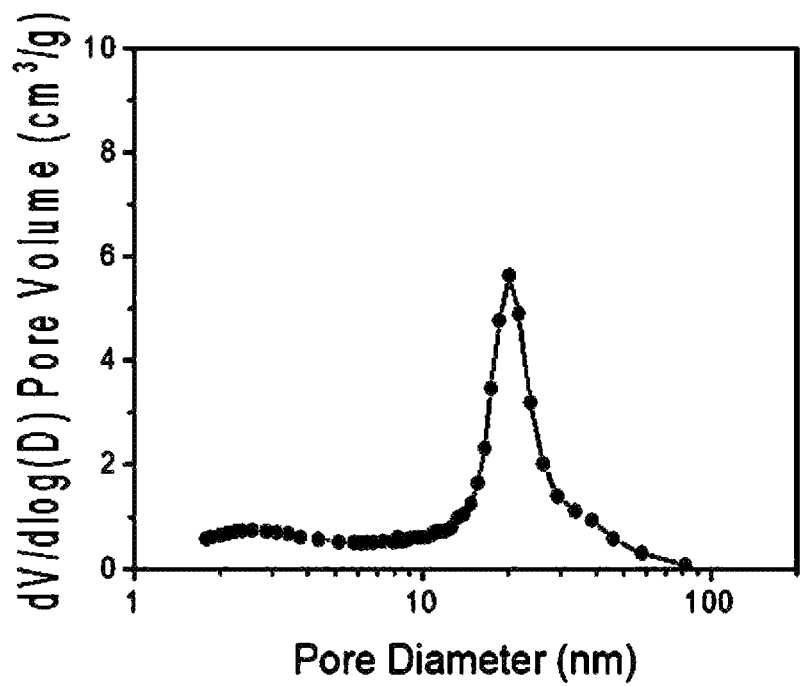

[FIG 13]
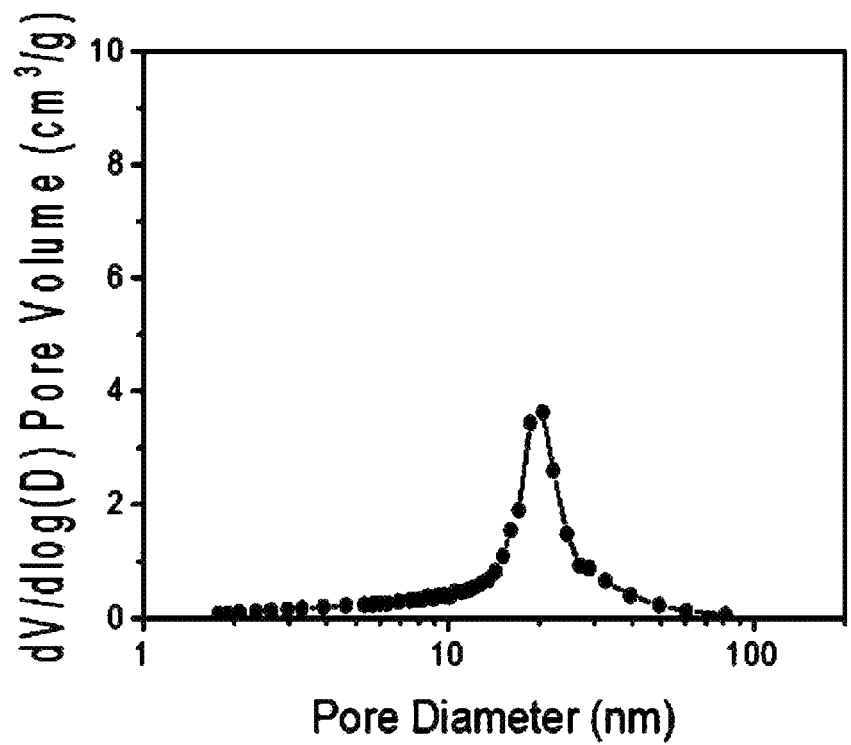

[FIG 14]
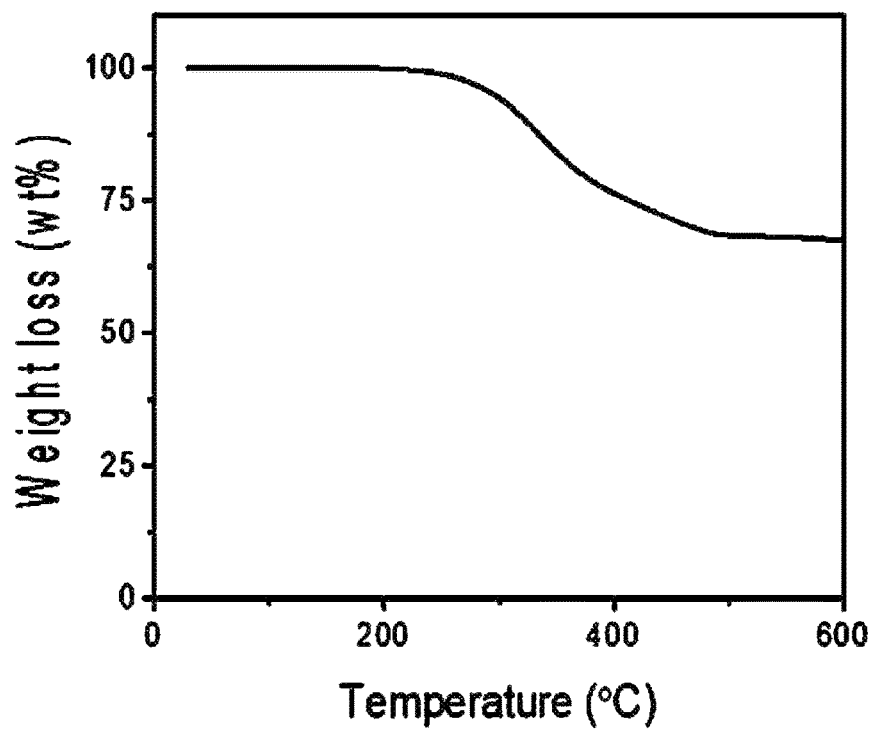
[FIG 15]
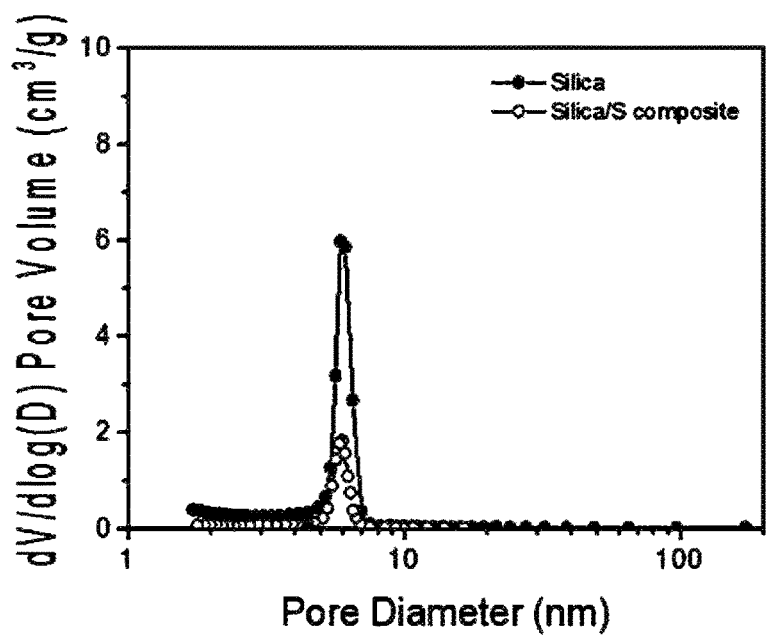

[FIG 16]
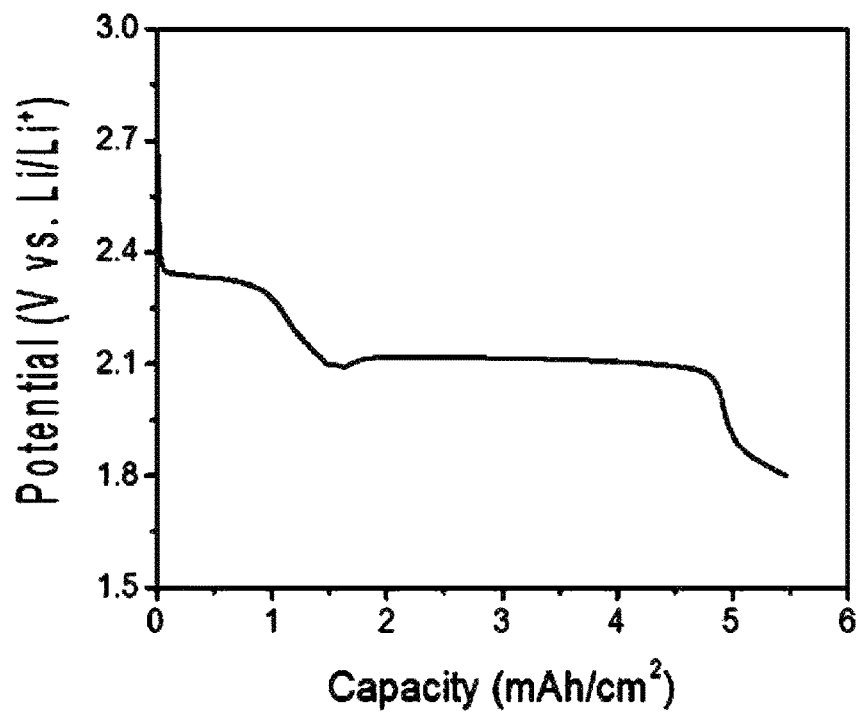
[FIG 17]
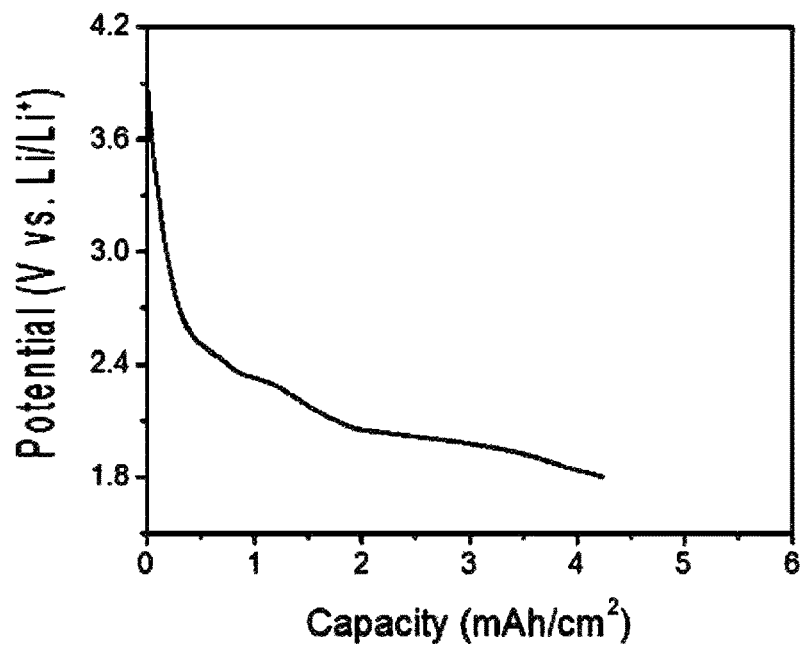

[FIG 18]
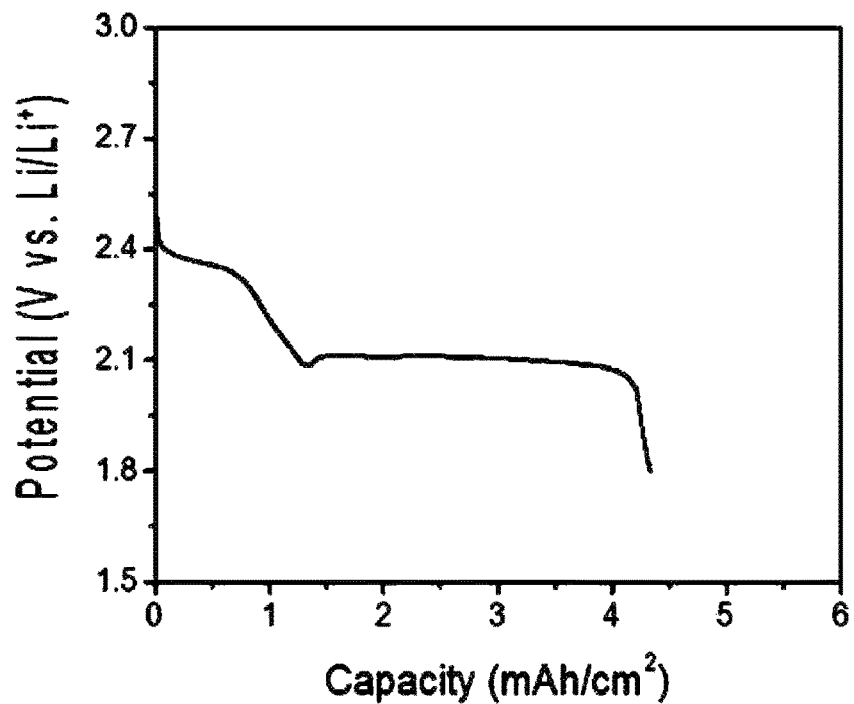
[FIG 19]
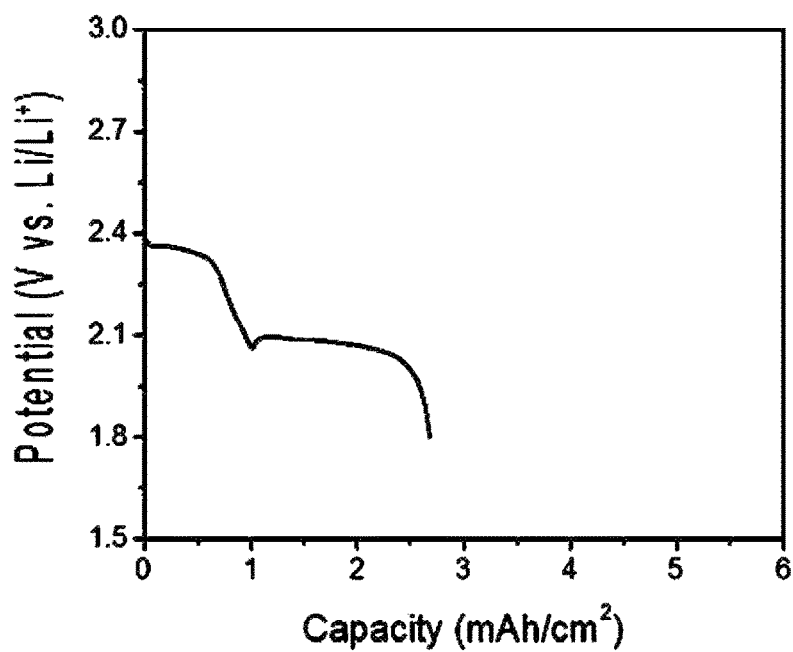

[FIG 20]
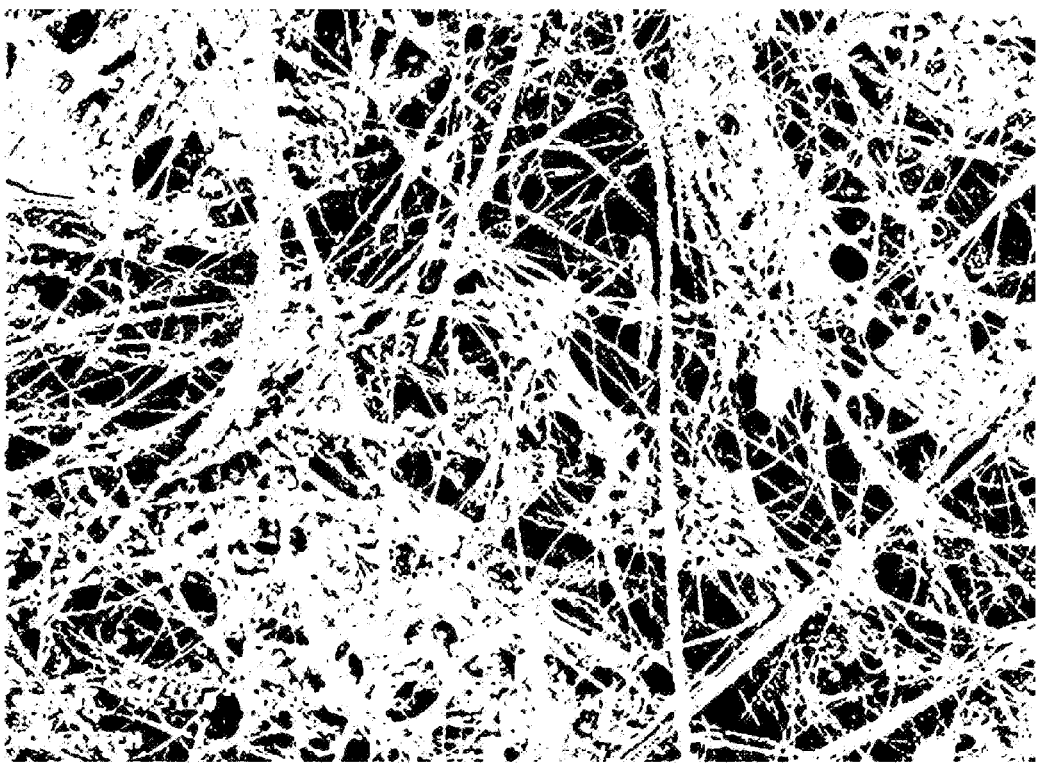
[FIG 21]
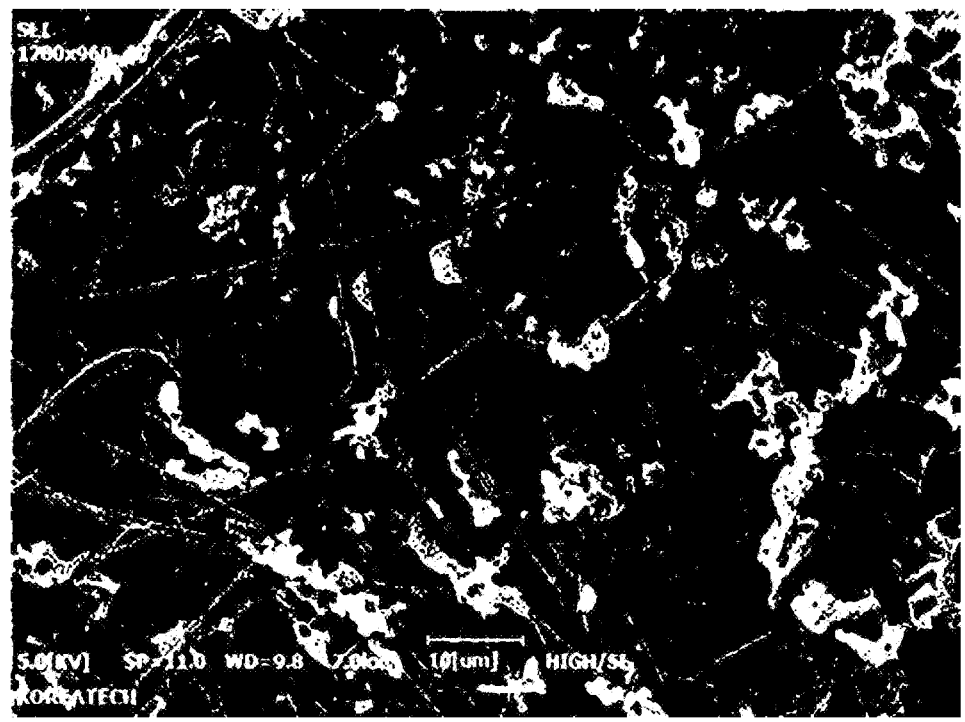

【FIG 22】
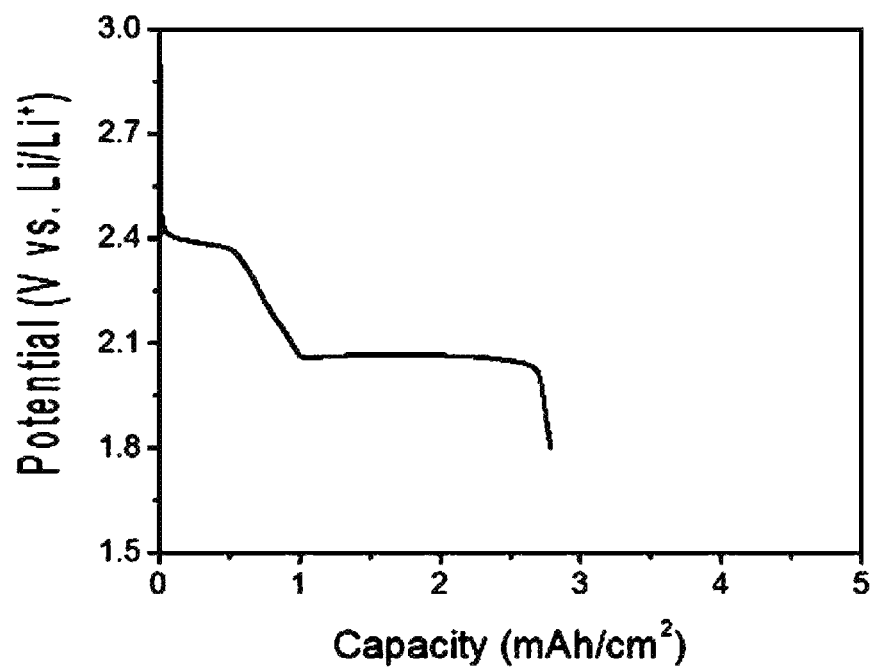
【FIG 23】
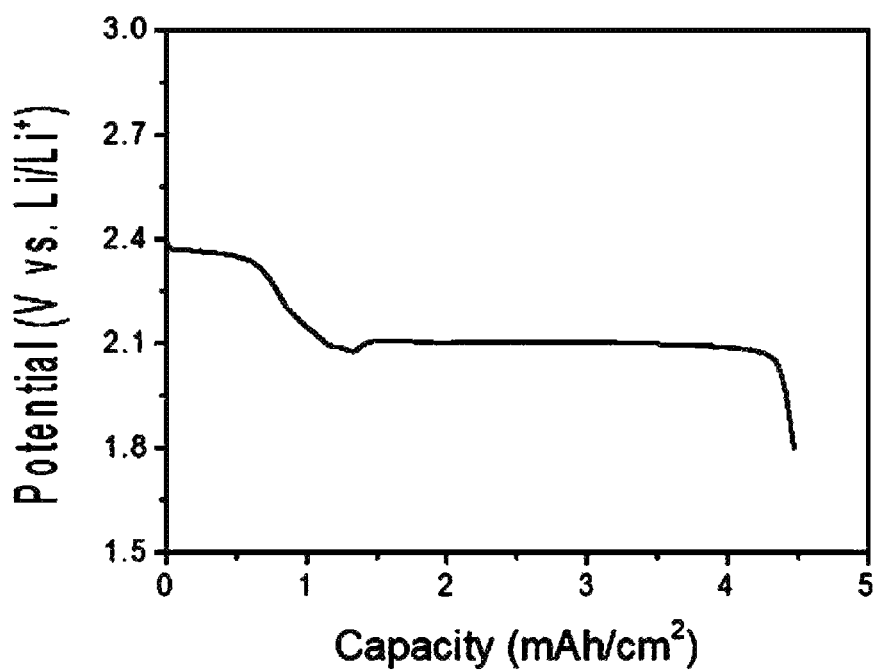

[FIG 24]
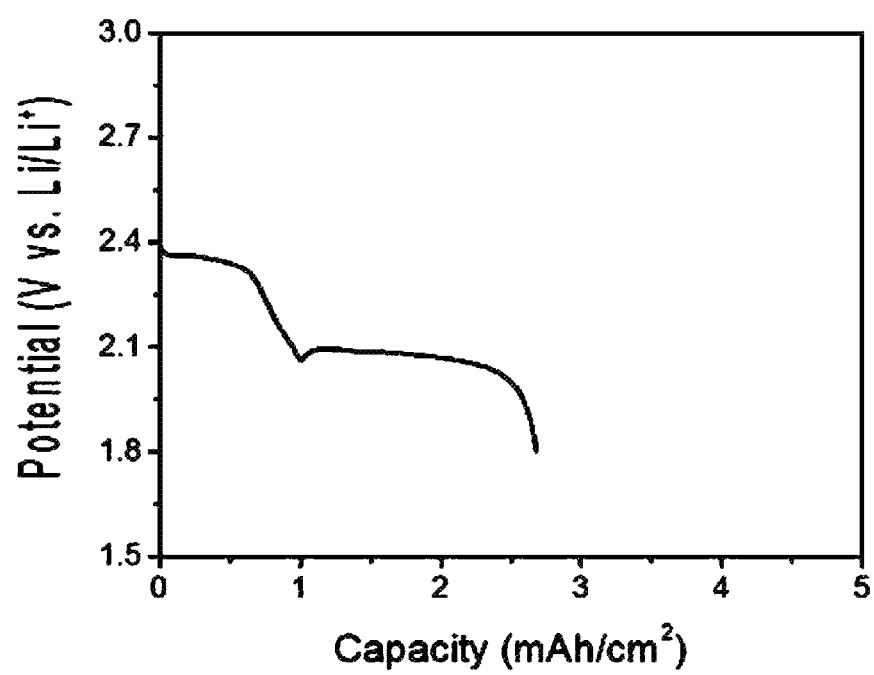

LITHIUM-SULFUR BATTERY

TECHNICAL FIELD

The present invention relates to a lithium-sulfur battery.

BACKGROUND ART

Demand for batteries with low costs and high energy density has been gradually increasing in various industrial fields requiring portable electronic devices and energy storage.

A lithium-sulfur battery, which is a secondary battery which uses a sulfur-based compound having a sulfur-sulfur bond (S—S bond) as a positive electrode active material and lithium metal as a negative electrode active material, has attracted great attention as a battery which can replace currently commercialized lithium-ion batteries due to low costs, high theoretical capacity and high energy density thereof. A lithium-sulfur battery stores and produces electrical energy through an oxidation-reduction reaction in which a S—S bond is broken in a positive electrode during a reduction reaction (discharging) and thus the oxidation number of sulfur (S) is decreased, and the oxidation number of sulfur is increased in a positive electrode during an oxidation reaction (charging) and thus a S—S bond is formed again.

However, a lithium-sulfur battery has not yet been widely used commercially because it has a poor lifetime characteristic and low volumetric energy density compared to currently commercially available lithium-ion batteries. Lithium metal, a negative electrode of a lithium-sulfur battery, is known as a material having electrochemically low reversibility and low stability. Meanwhile, a polysulfide, which is a discharging product of sulfur in a positive electrode, moves to a negative electrode, irreversibly reacts with lithium, and thus an active material disappears to decrease capacity. Due to these reasons, it is understood that the lifetime characteristic of a lithium-sulfur battery is poor. When an actual battery is manufactured into a full cell, the volumetric energy density of a lithium-sulfur battery is significantly lower than a theoretical value due to a low content of sulfur in a positive electrode and low current density of a positive electrode.

Before the principle of operation of a lithium-sulfur battery is revealed, it was thought that solid sulfur ($S_8$) particles directly receive electrons to start discharging, and solid lithium sulfide ($Li_2S$) particles generated by discharging the sulfur ($S_8$) directly receive electrons to progress charging. Based on this perception, papers in which sulfur or $Li_2S$ is injected into carbon or combined in order to increase electric conductivity by increasing a contact area of a conductive material and a solid sulfur particle (Ji et al., Nature Mater., vol. 8, p. 500, 2009; Zheng et al., Nano Lett., vol. 11, p. 4462, 2011; Yang et al., Nano Left., vol. 10, p. 1486, 2010; Yang et al., J. Am. Chem. Soc., vol. 134, p. 15387, 2012; and Cai et al., Nano Lett., vol. 12, p. 6474, 2012) have been published. During the last five years, research on porous carbon supporting sulfur or $Li_2S$ has been highlighted in the lithium-sulfur battery field.

However, currently published papers (Koh et al., J. Electrochem. Soc., vol. 161, p. A2117, 2014; and Koh et al., J. Electrochem. Soc., vol. 161, p. A2133, 2014) have shown that solid sulfur and $Li_2S$ particles which are electrically separated from a positive electrode can also participate in the reaction, and thus it was confirmed that electric charges are transferred at a solid-liquid interface not a solid-solid interface. This means that there is no reason to support sulfur in a pore of carbon because the electrochemical reaction of sulfur, which is an active material, is not related to contact with carbon.

Conventional studies have failed to obtain satisfactory effects of improving capacity characteristics of a lithium-sulfur battery and lowering a manufacturing cost thereof due to a high manufacturing cost of porous carbon supporting an active material and a limited amount of an active material that can be supported.

DISCLOSURE

Technical Problem

The present invention is directed to providing a lithium-sulfur battery having high energy density and improved capacity of a battery, a lithium-sulfur battery including a separator supporting elemental sulfur or lithium sulfide and thus having improved energy density and capacity of a battery, and a lithium-sulfur battery including an interlayer containing elemental sulfur ($S_8$) particles or lithium sulfide ($Li_2S$) particles as an active material and thus having high energy density and improved capacity of a battery.

Technical Solution

In order to accomplish the above objectives, there is provided a lithium-sulfur battery which includes a positive electrode including a conductive material; a lithium metal negative electrode; a separator located between the positive electrode and the negative electrode; and an electrolyte including a nonaqueous organic solvent and a lithium salt between the positive electrode and the negative electrode, wherein solid sulfur is introduced into an electrolyte solution region between the positive electrode and the negative electrode.

According to the present invention, the positive electrode includes solid sulfur or a carbon/sulfur composite.

According to the present invention, the conductive material of the positive electrode includes a carbon-based material.

According to the present invention, the lithium salt of the electrolyte is selected from $LiPF_6$, $LiBF_4$, $LiSbF_6$, $LiAsF_6$, $LiClO_4$, $LiCF_3SO_3$, $LiC_4F_9SO_3$, $LiSbF_6$, $LiN(SO_2CF_3)_2$, $LiNO_3$, LiBETI, or a combination thereof.

According to the present invention, the lithium salt of the electrolyte is included at a concentration of 0.1 to 2.0 M.

According to the present invention, the nonaqueous solvent of the electrolyte is selected from the group consisting of dimethoxyethane, diglyme, triglyme, tetraglyme, 1,3-dioxolane, diethyl ether, N-methylpyrrolidone, 3-methyl-2-oxazolidone, dimethylformamide, sulfolane, dimethylacetamide or dimethyl sulfoxide, dimethyl sulfate, ethylene glycol diacetate, dimethyl sulfite and ethylene glycol sulfite, and is used alone or in combination of one or more thereof.

According to the present invention, the solid sulfur introduced into the electrolyte region is located in at least one position among between the positive electrode and the separator, between the negative electrode and the separator, on a surface of the separator, on a surface of the positive electrode, and on a surface of the negative electrode.

According to the present invention, the solid sulfur introduced into the electrolyte region is added to an electrolyte solution.

According to the present invention, the solid sulfur introduced into the electrolyte region is applied in a form of a slurry including a binder to at least one surface among a surface of the positive electrode, a surface of the negative electrode, and a surface of the separator.

In order to accomplish the above objectives, there is provided a lithium-sulfur battery which includes a positive electrode including a conductive material; a lithium metal negative electrode; and an electrolyte including a lithium salt and a nonaqueous organic solvent between the positive electrode and the negative electrode, wherein an interlayer containing elemental sulfur ($S_8$) or lithium sulfide ($Li_2S$) is included in an electrolyte region between the positive electrode and the negative electrode.

According to the present invention, further comprising a separator in the electrolyte region between the positive electrode and the negative electrode, wherein the interlayer is disposed between the positive electrode and the separator.

According to the present invention, the conductive material of the positive electrode includes a carbon-based material.

According to the present invention, the positive electrode includes elemental sulfur or lithium sulfide as an active material.

According to the present invention, wherein the interlayer is formed of a composite of carbon or a nonconductive oxide, the elemental sulfur or lithium sulfide, and a binder.

According to the present invention, the interlayer is a composite prepared in a film form by mixing carbon or nonconductive oxide particles, elemental sulfur particles or lithium sulfide particles, and a binder.

According to the present invention, the carbon or nonconductive oxide particle is nonporous.

According to the present invention, the carbon or nonconductive oxide particle is porous.

According to the present invention, wherein the interlayer is prepared in a film form by mixing porous support particles in which elemental sulfur or lithium sulfide particles are injected into a pore of the carbon or nonconductive oxide with a binder.

According to the present invention, the porous support has a pore diameter of 1 nm to 10 um.

According to the present invention, the nonconductive oxide includes a nonconductive metal oxide.

According to the present invention, the nonconductive oxide includes silica.

According to the present invention, the lithium salt of the electrolyte is selected from $LiPF_6$, $LiBF_4$, $LiSbF_6$, $LiAsF_6$, $LiClO_4$, $LiCF_3SO_3$, $LiC_4F_9SO_3$, $LiSbF_6$, $LiN(SO_2CF_3)_2$, $LiNO_3$, LiBETI, or a combination thereof.

According to the present invention, the lithium salt of the electrolyte is included at a concentration of 0.1 to 2.0 M.

According to the present invention, the nonaqueous solvent of the electrolyte is selected from the group consisting of dimethoxyethane, diglyme, triglyme, tetraglyme, 1,3-dioxolane, diethyl ether, N-methylpyrrolidone, 3-methyl-2-oxazolidone, dimethylformamide, sulfolane, dimethylacetamide or dimethyl sulfoxide, dimethyl sulfate, ethylene glycol diacetate, dimethyl sulfite and ethylene glycol sulfite, and is used alone or in combination of one or more thereof.

In order to accomplish the above objectives, there is provided a lithium-sulfur battery which includes a positive electrode including a conductive material; a lithium metal negative electrode; and an electrolyte including a lithium salt and a nonaqueous organic solvent between the positive electrode and the negative electrode, wherein a separator supporting elemental sulfur particles or lithium sulfide particles is included between the positive electrode and the negative electrode.

According to the present invention, the positive electrode includes elemental sulfur or lithium sulfide as an active material.

According to the present invention, the conductive material of the positive electrode is a carbon-based material.

According to the present invention, the separator is an elemental sulfur-supported separator prepared by impregnating a separator with a carbon disulfide ($CS_2$) solution in which elemental sulfur is dissolved and drying.

According to the present invention, the separator is a lithium sulfide-supported separator prepared by impregnating a separator with an anhydrous ethanol solution in which lithium sulfide is dissolved and drying.

According to the present invention, the lithium salt of the electrolyte is selected from $LiPF_6$, $LiBF_4$, $LiSbF_6$, $LiAsF_6$, $LiClO_4$, $LiCF_3SO_3$, $LiC_4F_9SO_3$, $LiSbF_6$, $LiN(SO_2CF_3)_2$, $LiNO_3$, LiBETI, or a combination thereof.

According to the present invention, the lithium salt of the electrolyte is included at a concentration of 0.1 to 2.0 M.

According to the present invention, the nonaqueous solvent of the electrolyte is selected from the group consisting of dimethoxyethane, diglyme, triglyme, tetraglyme, 1,3-dioxolane, diethyl ether, N-methylpyrrolidone, 3-methyl-2-oxazolidone, dimethylformamide, sulfolane, dimethylacetamide or dimethyl sulfoxide, dimethyl sulfate, ethylene glycol diacetate, dimethyl sulfite and ethylene glycol sulfite, and is used alone or in combination of one or more thereof.

Advantageous Effects

According to the present invention, a lithium-sulfur battery having high energy density and improved capacity can be provided.

According to the present invention, a lithium-sulfur battery can have improved energy density and capacity by increasing a content of solid sulfur in the battery regardless of its location in the battery. Conventionally, there has been a problem in which a positive electrode is prepared in such a manner that the contact area of a conductive material such as a carbon-based material and solid sulfur is increased and thus a proportion of the conductive material in the battery is increased. However, according to the present invention, it is possible to increase an amount of sulfur while minimizing a proportion of a conductive material in the battery, to further increase volumetric energy density, and to improve capacity compared to conventional batteries. Also, since it is not necessary to increase the thickness of a positive electrode mixture layer for increasing current density of a lithium-sulfur battery, a positive electrode can be more easily prepared. Thickening a positive electrode mixture layer for increasing current density may be the simplest and clearest method, but it is substantially very difficult to make an electrode plate thicker.

According to the present invention, the energy density and capacity of a lithium-sulfur battery can be increased by increasing an amount of elemental sulfur or lithium sulfide without change of an electrode structure in an existing lithium-sulfur battery. Also, since it is not necessary to increase the thickness of a positive electrode mixture layer for increasing current density of a lithium-sulfur battery, a positive electrode can be more easily prepared.

According to the present invention, an interlayer acts as an elemental sulfur or lithium sulfide particle support and thus energy density and capacity can be increased, and simultaneously interferes with the movement of polysulfides to a negative electrode during charging and discharging and thus a lifetime of a lithium-sulfur battery can be increased.

According to the present invention, the energy density and capacity of a lithium-sulfur battery can be increased by increasing an amount of elemental sulfur or lithium sulfide without change of an existing electrode structure. That is, according to the present invention, energy density and capacity can be increased without the addition of an elemental sulfur or lithium sulfide support or an increase in an amount of a support.

DESCRIPTION OF DRAWINGS

FIG. 1 is an electron microscope image of mesoporous carbon according to Example 1.

FIG. 2 is a graph illustrating a pore size distribution of mesoporous carbon according to Example 1.

FIG. 3 is a graph illustrating specific surface areas and pore volumes of mesoporous carbon and a mesoporous carbon/sulfur composite according to Example 2.

FIG. 4 is a thermogravimetric analysis (TGA) result of a mesoporous carbon/sulfur composite according to Example 2.

FIG. 5 is a schematic view of a lithium-sulfur battery according to Example 3.

FIG. 6 is a graph illustrating a first discharge curve of a lithium-sulfur battery according to Example 3.

FIG. 7 is a schematic view of a lithium-sulfur battery according to Comparative Example 1.

FIG. 8 is a graph illustrating a first discharge curve of a lithium-sulfur battery according to Comparative Example 1.

FIG. 9 is a graph illustrating charge and discharge results of a lithium-sulfur battery according to Example 4 during initial two cycles.

FIG. 10 show graphs illustrating charge and discharge results of a lithium-sulfur battery according to Comparative Example 2 during initial two cycles.

FIG. 11 is an electron microscope image of mesoporous carbon according to Example 5 of the present invention.

FIG. 12 is a graph illustrating a pore size distribution of mesoporous carbon according to Example 5 of the present invention.

FIG. 13 is a graph illustrating a pore size distribution of a mesoporous carbon/sulfur composite according to Example 6 of the present invention.

FIG. 14 is a thermogravimetric analysis (TGA) result of a mesoporous carbon/sulfur composite according to Example 6 of the present invention.

FIG. 15 is a graph illustrating a pore size distribution of a mesoporous silica/sulfur composite according to Example 8 of the present invention.

FIG. 16 is a graph illustrating the discharge capacity per unit area of a lithium-sulfur battery according to Example 9 of the present invention.

FIG. 17 is a graph illustrating the discharge capacity per unit area of a lithium-sulfur battery according to Example 10 of the present invention.

FIG. 18 is a graph illustrating the discharge capacity per unit area of a lithium-sulfur battery according to Example 11 of the present invention.

FIG. 19 is a graph illustrating the discharge capacity per unit area of a lithium-sulfur battery according to Comparative Example 3 of the present invention.

FIG. 20 is an electron microscope image of a separator supporting lithium sulfide according to Example 12 of the present invention.

FIG. 21 is an electron microscope image of a separator supporting elemental sulfur according to Example 13 of the present invention.

FIG. 22 is a graph illustrating the discharge capacity per unit area of a lithium-sulfur battery according to Example 14 of the present invention.

FIG. 23 is a graph illustrating the discharge capacity per unit area of a lithium-sulfur battery according to Example 15 of the present invention.

FIG. 24 is a graph illustrating the discharge capacity per unit area of a lithium-sulfur battery according to Comparative Example 4 of the present invention.

MODES OF THE INVENTION

Hereinafter, a lithium-sulfur battery according to the present invention will be described in detail with reference to embodiments. However, the present invention is not limited to the following embodiments.

A lithium-sulfur battery according to an embodiment of the present invention includes a positive electrode including solid sulfur and a conductive material; a lithium metal negative electrode; a separator located between the positive electrode and the negative electrode; and an electrolyte including a nonaqueous organic solvent and a lithium salt between the positive electrode and the negative electrode. Here, solid sulfur is additionally introduced into an electrolyte solution region.

According to the present invention, the conductive material may include a carbon-based material, and the positive electrode may be prepared by applying a composition including a carbon-based material and a binder to a current collector such as carbon-coated aluminum foil or applying a composition including a carbon/sulfur composite or solid sulfur, a carbon-based material and a binder to a current collector.

According to the present invention, the solid sulfur introduced into an electrolyte region in the lithium-sulfur battery is dissolved in an electrolyte solution, moves to a positive electrode through diffusion, and participates in an electrode reaction at a surface of the positive electrode. Therefore, a conventional lithium-sulfur battery has an active material only in a positive electrode, but solid sulfur particles introduced into an electrolyte solution region participate in an electrochemical reaction in the present invention, and thus the capacity per unit area and energy density of the battery may be improved.

Therefore, the solid sulfur introduced into an electrolyte solution region is not limited in an introducing method thereof, and various methods of increasing an amount of solid sulfur in a battery can be used. Accordingly, a lithium-sulfur battery having improved energy density and capacity can be manufactured.

Therefore, the solid sulfur introduced into an electrolyte region may be located between the positive electrode and the separator, between the negative electrode and the separator, on a surface of the separator, on a surface of the positive electrode, or on a surface of the negative electrode.

In addition, according to the present invention, the solid sulfur introduced into an electrolyte region can be applied to a surface of the positive electrode, a surface of the negative electrode, or a surface of the separator, and may be prepared in a form of a slurry including a binder for application.

Also, according to the present invention, the solid sulfur introduced into an electrolyte region may be introduced in such a manner that solid sulfur is directly added to an electrolyte solution. That is, an electrolyte solution may be injected in a state in which sulfur is added into an electrolyte region, or solid sulfur is first added into a region to be filled with an electrolyte and then an electrolyte solution may be injected.

As such, the solid sulfur introduced into an electrolyte solution region is dissolved in an electrolyte solution to form sulfur molecules, and electric charges are transferred from a surface of a conductive material of a positive electrode such as a carbon-based material to sulfur molecules to form polysulfide ions, thereby discharging occurs.

The lithium salt of the electrolyte according to the present invention may be any salt containing a lithium cation. Preferably, the lithium salt may be selected from $LiPF_6$, $LiBF_4$, $LiSbF_6$, $LiAsF_6$, $LiClO_4$, $LiCF_3SO_3$, $LiC_4F_9SO_3$, $LiSbF_6$, $LiN(SO_2CF_3)_2$, $LiNO_3$, LiBETI, or a combination thereof. Here, the lithium salt of the electrolyte may be included at a concentration of 0.1 to 2.0 M.

The nonaqueous organic solvent of the electrolyte according to the present invention may be 1,3-dioxolane or an ether-based solvent. The ether-based solvent may be dibutyl ether, tetraglyme, diglyme, dimethoxyethane, 2-methyltetrahydrofuran, polyethylene glyme dimethyl ether, tetrahydrofuran or the like. In the present invention, the nonaqueous organic solvent may be preferably selected from the group consisting of dimethoxyethane, diglyme, triglyme, tetraglyme, 1,3-dioxolane, diethyl ether, N-methylpyrrolidone, 3-methyl-2-oxazolidone, dimethylformamide, sulfolane, dimethylacetamide or dimethyl sulfoxide, dimethyl sulfate, ethylene glycol diacetate, dimethyl sulfite and ethylene glycol sulfite, and may be used alone or in combination of one or more thereof. When the nonaqueous organic solvent is used in combination of one or more thereof, a mixing ratio may be appropriately adjusted according to desired performance of a battery.

A lithium-sulfur battery according to the present invention includes a positive electrode including a conductive material; a lithium metal negative electrode; and an electrolyte solution in which a lithium salt and a nonaqueous organic solvent are mixed between the positive electrode and the negative electrode, wherein an interlayer containing elemental sulfur particles or lithium sulfide particles is included in the electrolyte region.

According to the present invention, the conductive material included in the positive electrode may include various conductive materials such as a carbon-based material and a conductive polymer, and preferably includes a carbon-based material.

Also, according to the present invention, the positive electrode is not limited to the inclusion of elemental sulfur or lithium sulfide like a conventional lithium-sulfur battery. However, in order to increase an amount of elemental sulfur or lithium sulfide in the lithium-sulfur battery, elemental sulfur or lithium sulfide may be included.

According to the present invention, an interlayer is disposed between the positive electrode and the separator. The interlayer disposed between the positive electrode and the separator increases an amount of elemental sulfur or lithium sulfide which participates in the chemical reaction in the battery, and thus improves capacity per unit volume, energy density and a lifetime of the battery.

According to the present invention, the interlayer may be formed of a composite of carbon or a nonconductive oxide, elemental sulfur or lithium sulfide and a binder. The nonconductive oxide includes both a nonconductive metal oxide and a nonconductive nonmetal oxide. As the nonmetal oxide, silica is preferable.

According to one embodiment of the present invention, the composite may be prepared in a film (or membrane) form by mixing carbon or nonconductive oxide particles, elemental sulfur or lithium sulfide particles and a binder. Here, the carbon or nonconductive oxide particles include both a porous particle and a nonporous particle.

According to another embodiment of the present invention, the composite may be prepared by preparing carbon or a nonconductive oxide into a porous support and injecting elemental sulfur or lithium sulfide particles into a pore of the porous support. That is, the interlayer may be prepared in a film (or membrane) form by mixing carbon or nonconductive oxide support particles in which elemental sulfur or lithium sulfide particles are injected with a binder.

According to the present invention, sulfur particles included in the interlayer are dissolved in an electrolyte solution, move to the positive electrode including the conductive material, and participate in an electrode reaction at a carbon surface in the positive electrode. Meanwhile, insoluble lithium sulfide particles react with polysulfide having high solubility and a long chain length to form polysulfide ions having an intermediate chain length, and the ions move to the positive electrode and participate in an electrode reaction at a carbon surface in the positive electrode. Therefore, a conventional lithium-sulfur battery has an active material only in a positive electrode, but solid sulfur or lithium sulfide particles included in the interlayer participate in an electrochemical reaction in the present invention, and as a result, capacity per unit volume and energy density may be improved. According to the present invention, a component of the composite constituting the interlayer is not limited to conductive carbon, and a nonconductive oxide may be used. In particular, even when silica which is a nonconductive nonmetal oxide is used, it is possible to increase energy density and capacity of a lithium-sulfur battery.

In addition, according to the present invention, the interlayer interferes with the movement of polysulfides to the negative electrode and thus blocks an irreversible reaction of polysulfides and lithium at a surface of the negative electrode, thereby the loss of an active material may be prevented.

A polysulfide generated in a lithium-sulfur battery during charging and discharging is known to be diffused out of the positive electrode and corrode a surface of the negative electrode. However, according to the present invention, since carbon or nonconductive oxide particles constituting the interlayer interfere with the movement of polysulfides to a negative electrode, a lifetime of a lithium-sulfur battery may be improved. In this respect, the carbon or nonconductive oxide particle preferably has a small particle diameter, and more preferably is a porous particle.

In addition, it is even more preferable that elemental sulfur or lithium sulfide particles be injected into a pore of a porous support particle. Since polysulfide having a long chain length is dissolved well and diffused in an electrolyte solution, the diffusion of polysulfide may be more effectively prevented in an interlayer in which elemental sulfur or lithium sulfide particles are injected into a pore of a porous support.

The present invention presents porous carbon and porous silica as porous supports in exemplary embodiments. Carbon and silica are advantageous for forming a porous support. The porous support has a pore diameter of 1 nm to 10 um, and elemental sulfur or lithium sulfide particles are supported in a solid form in a pore of a porous support particle. When a pore diameter of the support is less than 1 nm, the pore diameter is too small to support an active material, and it is difficult for an electrolyte solution to flow in and out and thus an electrochemical reaction is not smoothly performed. Also, when a pore diameter of the support is greater than 10 um, storage characteristics of polysulfide generated by discharging an active material are degraded, and thus polysulfide moves to a surface of a negative electrode, reacts with the negative electrode, and is inactivated, resulting in degraded lifetime characteristics.

The lithium salt of the electrolyte according to the present invention may be any salt containing a lithium cation. Preferably, the lithium salt may be selected from $LiPF_6$, $LiBF_4$, $LiSbF_6$, $LiAsF_6$, $LiClO_4$, $LiCF_3SO_3$, $LiC_4F_9SO_3$, $LiSbF_6$, $LiN(SO_2CF_3)_2$, $LiNO_3$, LiBETI, or a combination thereof. Here, the lithium salt of the electrolyte may be included at a concentration of 0.1 to 2.0 M.

The nonaqueous organic solvent of the electrolyte according to the present invention may be 1,3-dioxolane or an ether-based solvent. The ether-based solvent may be dibutyl ether, tetraglyme, diglyme, dimethoxyethane, 2-methyltetrahydrofuran, polyethylene glyme dimethyl ether, tetrahydrofuran or the like. In the present invention, the nonaqueous organic solvent may be preferably selected from the group consisting of dimethoxyethane, diglyme, triglyme, tetraglyme, 1,3-dioxolane, diethyl ether, N-methylpyrrolidone, 3-methyl-2-oxazolidone, dimethylformamide, sulfolane, dimethylacetamide or dimethyl sulfoxide, dimethyl sulfate, ethylene glycol diacetate, dimethyl sulfite and ethylene glycol sulfite, and may be used alone or in combination of one or more thereof. When the nonaqueous organic solvent is used in combination of one or more thereof, a mixing ratio may be appropriately adjusted according to desired performance of a battery.

A lithium-sulfur battery according to the present invention includes a positive electrode including a conductive material; a lithium metal negative electrode; an electrolyte solution in which a lithium salt and a nonaqueous organic solvent are mixed between the positive electrode and the negative electrode; and elemental sulfur or lithium sulfide as an active material, wherein a separator supporting elemental sulfur particles or lithium sulfide particles is included between the positive electrode and the negative electrode.

According to the present invention, the present invention is not limited to the inclusion of elemental sulfur or lithium sulfide which is an active material in a positive electrode. As described above, currently published papers (Koh et al., J. Electrochem. Soc., vol. 161, p. A2117, 2014; and Koh et al., J. Electrochem. Soc., vol. 161, p. A2133, 2014) have shown that solid sulfur and $Li_2S$ particles which are electrically separated from a positive electrode can also participate in the reaction, and thus it was confirmed that electric charges are transferred at a solid-liquid interface not a solid-solid interface. This means that there is no reason to support elemental sulfur or lithium sulfide in a pore of a conductive material constituting a positive electrode because the electrochemical reaction of sulfur, which is an active material, is not related to contact with carbon.

Therefore, elemental sulfur or lithium sulfide, an active material in the lithium-sulfur battery, may be introduced in such a manner that elemental sulfur or lithium sulfide is added onto a surface of the positive electrode or onto a surface of the negative electrode, between the positive electrode and the separator, between the negative electrode and the separator, or to an electrolyte solution. However, in order to increase an amount of elemental sulfur or lithium sulfide in the lithium-sulfur battery, it is preferable that a positive electrode include elemental sulfur or lithium sulfide.

According to the present invention, the conductive material of the positive electrode may be various conductive materials such as a carbon-based material and a conductive polymer, and preferably is a carbon-based material.

According to the present invention, a separator has a function of a conventional separator, and simultaneously acts as an elemental sulfur or lithium sulfide support which increases an amount of elemental sulfur or lithium sulfide in the battery. Elemental sulfur particles or lithium sulfide particles supported in the separator are dissolved in an electrolyte solution, move to a positive electrode including a conductive material, and participate in an electrode reaction at a surface of the positive electrode. Therefore, capacity per unit volume and energy density of the battery may be improved compared to a lithium-sulfur battery using a separator which does not support elemental sulfur or lithium sulfide. That is, capacity characteristics may be improved by increasing an amount of an active material in the battery even without an increase in an amount of a support for supporting an active material in the battery or an additional use of a support.

According to the present invention, the separator supporting elemental sulfur or lithium sulfide particles may be prepared by impregnating a separator with a carbon disulfide ($CS_2$) solution in which elemental sulfur is dissolved and then drying, or by impregnating a separator with an anhydrous ethanol solution in which lithium sulfide is dissolved and then drying.

According to the present invention, elemental sulfur particles or lithium sulfide particles included in the separator preferably have a diameter of 5 nm to 100 um. A volume of elemental sulfur particles or lithium sulfide particles included in the separator is preferably 10% to 90%, and is more preferably 20% to 80% of the total pore volume of the separator.

The lithium salt of the electrolyte according to the present invention may be any salt containing a lithium cation. Preferably, the lithium salt may be selected from $LiPF_6$, $LiBF_4$, $LiSbF_6$, $LiAsF_6$, $LiClO_4$, $LiCF_3SO_3$, $LiC_4F_9SO_3$, $LiSbF_6$, $LiN(SO_2CF_3)_2$, $LiNO_3$, LiBETI, or a combination thereof. Here, the lithium salt of the electrolyte may be included at a concentration of 0.1 to 2.0 M.

The nonaqueous organic solvent of the electrolyte according to the present invention may be 1,3-dioxolane or an ether-based solvent. The ether-based solvent may be dibutyl ether, tetraglyme, diglyme, dimethoxyethane, 2-methyltetrahydrofuran, polyethylene glyme dimethyl ether, tetrahydrofuran or the like. In the present invention, the nonaqueous organic solvent may be preferably selected from the group consisting of dimethoxyethane, diglyme, triglyme, tetraglyme, 1,3-dioxolane, diethyl ether, N-methylpyrrolidone, 3-methyl-2-oxazolidone, dimethylformamide, sulfolane, dimethylacetamide or dimethyl sulfoxide, dimethyl sulfate, ethylene glycol diacetate, dimethyl sulfite and ethylene glycol sulfite, and may be used alone or in combination of one or more thereof. When the nonaqueous organic solvent is used in combination of one or more thereof, a mixing ratio may be appropriately adjusted according to desired performance of a battery.

Example 1: Preparation of Mesoporous Carbon Particle 6.25 g of sucrose ($C_{12}H_{22}O_{11}$) was dissolved in 100 mL of distilled water and then 0.4 mL of sulfuric acid was added thereto. 5.5 g of spherical nano-silica (20 nm, 40% in $H_2O$, Alfa Aesar) was added to the resulting solution and uniformly dispersed. The dispersed solution was heated at 110° C. for 6 hours and then further heated at 160° C. for 6 hours to remove water. The solid material thus obtained was carbonized at 900° C. for 3 hours to obtain a silica-carbon composite. A silica template in the composite thus prepared was removed using a 10% hydrofluoric acid aqueous solution to prepare mesoporous carbon particles. A scanning electron microscope (SEM) image of the mesoporous carbon particle thus prepared is shown in FIG. 1. Referring to FIG. 1, it can be seen that porous carbon particles including nanoscale mesopores were formed. Also, a size distribution of pores of the mesoporous carbon particles is shown FIG. 2. Referring to FIG. 2, it can be seen that pores having a diameter of 20 nm are most formed in the prepared carbon particles.

Example 2: Preparation of Mesoporous Carbon/Sulfur Nanocomposite

The mesoporous carbon prepared in Example 1 and sulfur were mixed at a mass ratio of 1:4 and put into a glass reaction container, and then gas was removed using a vacuum pump for 30 minutes. Afterward, the mixture was heated at 150° C. for 12 hours to inject sulfur into a mesopore. Pore volumes and specific surface areas ($S_{BET}$) of mesoporous carbon and a mesoporous carbon/sulfur nanocomposite are shown in FIG. 3. Referring to FIG. 3, it can be seen that pore volume and specific surface area ($S_{BET}$) were significantly decreased after sulfur was injected. Referring to FIG. 4, it can be seen through thermogravimetric analysis (TGA) that a content of sulfur in the carbon/sulfur nanocomposite is about 78%.

Example 3: Manufacture of Lithium-Sulfur Battery in which Sulfur is Introduced Between Positive Electrode and Negative Electrode A 50 wt % mesoporous carbon/sulfur nanocomposite (Sigma-Aldrich, 99.9%) as a positive electrode active material, 20 wt % polyethylene oxide (Sigma-Aldrich, 99.9%) as a binder, and 10 wt % Ketjenblack (KB-600, Akzo Nobel, Japan EC-600JD) as a conductive material were mixed for 12 hours or more, and then dispersed in an acetonitrile solvent to prepare a positive electrode mixture layer composition. The composition thus prepared was applied to carbon-coated aluminum foil, vacuum-dried at 40° C. for 12 hours, and rolled to prepare a positive electrode. A mixed solution of dimethoxyethane/diglyme/1,3-dioxolane (a volume ratio of 6/2/2) in which $LiN(SO_2CF_3)_2$ and $LiNO_3$ were dissolved at concentrations of 1.0 M and 0.3 M, respectively, was used as an electrolyte solution. The prepared positive electrode, lithium foil as a negative electrode, and the prepared electrolyte solution were used to manufacture a lithium-sulfur battery. 5 mg of sulfur powder was added to the electrolyte solution region. The sulfur powder was present in the electrolyte solution region between the positive electrode and the negative electrode. A polyolefin-based separator (Celgard, LLC) was used as a separator.

FIG. 5 is a schematic view of the lithium-sulfur battery according to Example 3. An amount of sulfur in the positive electrode was 2.5 mg per unit area ($cm^2$), and an amount of sulfur in the electrolyte solution region was 2.5 mg per unit area ($cm^2$). The manufactured lithium-sulfur battery was discharged at constant current (0.1 C rate) until 1.8 V. A measurement result is shown in FIG. 6.

Comparative Example 1: Lithium-Sulfur Battery

A lithium-sulfur battery was manufactured in the same manner as in Example 3 except that sulfur powder was not added to an electrolyte solution region between a positive electrode and a negative electrode. An amount of sulfur in the positive electrode was 2.5 mg per unit area ($cm^2$). The manufactured lithium-sulfur battery was discharged at constant current (0.1 C rate) until 1.8 V. FIG. 7 is a schematic view of the lithium-sulfur battery according to Comparative Example 1. A measurement result is shown in FIG. 8.

Evaluation Example 1: Evaluation of Capacity Per Unit Area of Lithium-Sulfur Battery The lithium-sulfur battery according to Example 3 and the lithium-sulfur battery according to Comparative Example 1 were discharged at constant current (0.1 C rate) until 1.8 V. FIG. 6 shows a measurement result of the lithium-sulfur battery according to Example 3, and FIG. 8 shows a measurement result of the lithium-sulfur battery according to Comparative Example 1.

Referring to FIG. 6 and FIG. 8, it can be seen that discharge capacity per unit area increased by about 51% in the case of Example 3 compared to Comparative Example 1.

Example 4: Lithium-Sulfur Battery

Mesocarbon microbeads (MCMB) graphite, Ketjenblack (KB-600, Akzo Nobel, Japan EC-600JD) as a conductive material and polyethylene oxide (Sigma-Aldrich, 99.9%) as a binder were mixed at a weight ratio of 1:1:2, and then dispersed in an acetonitrile solvent to prepare a positive electrode mixture layer composition. The composition thus prepared was applied to carbon-coated aluminum foil, vacuum-dried at 40° C. for 12 hours, and rolled to prepare a positive electrode.

Lithium foil was used as a negative electrode, and a mixed solution of dimethoxyethane/diglyme/1,3-dioxolane (a volume ratio of 6/2/2) in which $LiN(SO_2CF_3)_2$ and $LiNO_3$ were dissolved at concentrations of 1.0 M and 0.3 M, respectively, was used as an electrolyte solution. The prepared positive electrode, lithium foil as a negative electrode, and the prepared electrolyte solution were used to manufacture a lithium-sulfur battery. 5 mg of sulfur powder was added to the electrolyte solution region. The sulfur powder was present in the electrolyte solution region between the positive electrode and the negative electrode. An amount of sulfur in the electrolyte solution region was 2.5 mg per unit area ($cm^2$). The manufactured lithium-sulfur battery was discharged at constant current (0.1 C rate) until 1.8 V. A measurement result is shown in FIG. 9.

Comparative Example 2: Lithium-Sulfur Battery

Solid sulfur, mesocarbon microbeads (MCMB) graphite, Ketjenblack (KB-600, Akzo Nobel, Japan EC-600JD) as a conductive material and polyethylene oxide (Sigma-Aldrich, 99.9%) as a binder were mixed at a weight ratio of 4:1:1:2, and then dispersed in an acetonitrile solvent to prepare a positive electrode mixture layer composition. The positive electrode mixture layer composition thus prepared was applied to carbon-coated aluminum foil, vacuum-dried at 40° C. for 12 hours, and rolled to prepare a positive electrode.

Lithium foil was used as a negative electrode, and a mixed solution of dimethoxyethane/diglyme/1,3-dioxolane (a volume ratio of 6/2/2) in which $LiN(SO_2CF_3)_2$ and $LiNO_3$ were dissolved at concentrations of 1.0 M and 0.3 M, respectively, was used as an electrolyte solution. The prepared positive electrode, lithium foil as a negative electrode, and the prepared electrolyte solution were used to manufacture a lithium-sulfur battery. An amount of sulfur in the positive electrode was 2.5 mg per unit area (cm²). The manufactured lithium-sulfur battery was discharged at constant current (0.1 C rate) until 1.8 V. A measurement result is shown in FIG. 10.

Evaluation Example 2: Evaluation of Electrochemical Performance of Lithium-Sulfur Battery with Electrically Insulated Sulfur The lithium-sulfur battery with electrically insulated sulfur according to Example 4 and the lithium-sulfur battery according to Comparative Example 2 were discharged at constant current (0.1 C rate) until 1.8 V. FIG. 9 shows a measurement result of the lithium-sulfur battery according to Example 4, and FIG. 10 shows a measurement result of the lithium-sulfur battery according to Comparative Example 2.

As shown in FIG. 9 and FIG. 10, when the characteristics of the lithium-sulfur battery according to Example 4 and the lithium-sulfur battery according to Comparative Example 2 were compared, it can be seen that, although sulfur included in the electrolyte region was completely electrically insulated from the positive electrode in the case of the lithium-sulfur battery according to Example 4, almost the same characteristics are exhibited except for some sections at an early stage of the reaction.

From these results, it can be seen that solid sulfur included in an electrolyte region in a lithium-sulfur battery was dissolved in an electrolyte solution, moved to a positive electrode through diffusion, and participated in an electrode reaction at a surface of a carbon electrode. That is, it is interpreted that solid sulfur is dissolved in an electrolyte solution to form sulfur molecules (see the following Formula (1)), and electric charges are transferred from a surface of a conductive material of a positive electrode such as a carbon-based material to sulfur molecules dissolved in the solution to form polysulfide ions (see the following Formula (2)). It is interpreted that the characteristic difference in some section at an early stage of the reaction results in mass transfer overpotential occurring as the diffusion distance at which solid sulfur included in the electrolyte solution is dissolved in an electrolyte solution and thus reaches a surface of a positive electrode in Example 2 is increased.

$$S_8 \text{ (solid)} \longleftrightarrow S_8 \text{ (solution)} \quad (1)$$

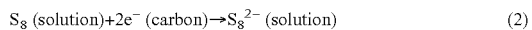
$$S_8 \text{ (solution)} + 2e^- \text{ (carbon)} \rightarrow S_8^{2-} \text{ (solution)} \quad (2)$$

From the above-described evaluation examples in which examples and comparative examples were compared, it can be seen that volumetric energy density and capacity may be increased by introducing solid sulfur into an electrolyte region in a lithium-sulfur battery. In particular, from an evaluation result of Example 4 in which solid sulfur, which is electrically insulated from a positive electrode, was introduced into an electrolyte region, it can be seen that the energy density and capacity of a lithium-sulfur battery may be increased by increasing an amount of sulfur included in the battery, and there is no limitation in an introducing method.

Therefore, according to the present invention, solid sulfur may be included in various forms in an electrolyte region of a lithium-sulfur battery. According to the present invention, solid sulfur may be included in an electrolyte solution region by applying solid sulfur to a surface of a positive electrode, a surface of a negative electrode or both sides of a surface of a separator or by applying solid sulfur in a form of a slurry including a binder, or may also be included by adding to an electrolyte solution.

There may be some difference in an initial characteristic of a battery depending on a position into which solid sulfur is introduced, but this is interpreted as resulting in mass transfer overpotential occurring as the diffusion distance at which solid sulfur is dissolved in an electrolyte solution and thus reaches a surface of a positive electrode is increased.

In addition, according to the present invention, solid sulfur in the lithium-sulfur battery forms a positive electrode mixture layer and thus may be included in a positive electrode and simultaneously in an electrolyte solution region. Therefore, it is possible to increase an amount of sulfur in the battery while minimizing a proportion of a conductive material in the battery, to further increase volumetric energy density, and to improve capacity compared to conventional batteries. Also, it is easier to prepare a positive electrode in the lithium sulfur battery.

Example 5: Preparation of Mesoporous Carbon Particle 6.25 g of sucrose ($C_{12}H_{22}O_{11}$) was dissolved in 100 mL of distilled water and then 0.4 mL of sulfuric acid was added thereto. 5 g of spherical nano-silica having an average diameter of 20 nm was added to the resulting solution and uniformly dispersed. The dispersed solution was heated at 110° C. for 6 hours and then further heated at 160° C. for 6 hours to remove water. The solid material thus obtained was carbonized at 900° C. for 3 hours to obtain a silica-carbon composite. A silica template in the composite thus prepared was removed using a 10% hydrofluoric acid aqueous solution to prepare mesoporous carbon particles.

FIG. 11 is a scanning electron microscope (SEM) image of the mesoporous carbon particle thus prepared. Referring to FIG. 11, it can be seen that porous carbon particles including nanoscale mesopores are formed.

FIG. 12 is a graph illustrating a size distribution of pores included in the mesoporous carbon particles. Referring to FIG. 12, it can be seen that a diameter of a pore included in the prepared carbon particle is in a range of about 16 nm to 26 nm, and pores having a diameter of 20 nm are most formed.

Example 6: Preparation of Carbon/Sulfur Composite and Preparation of Interlayer Using the Same The mesoporous carbon prepared in Example 5 and sulfur were mixed at a mass ratio of 2:1 and put into a glass reaction container, and then gas was removed using a vacuum pump for 30 minutes. Afterward, the mixture was heated at 155° C. for 12 hours to inject sulfur into a mesopore.

FIG. 13 is a graph illustrating a pore size distribution of a carbon/sulfur nanocomposite. Referring to FIG. 13, it can be seen that pore size significantly decreased after sulfur was injected. Referring to FIG. 14, it can be seen through thermogravimetric analysis (TGA) that a content of sulfur in the carbon/sulfur nanocomposite is about 32.55%.

The carbon/sulfur nanocomposite and a Teflon binder were mixed at a weight ratio of 6:1, rolled and dried to prepare an interlayer.

Example 7: Preparation of Carbon/Li₂S Composite and Preparation of Interlayer Using the Same 0.4 g of Li₂S (Sigma-Aldrich, 99.9%) was dissolved in 15 mL of anhydrous ethanol to prepare a Li₂S solution. The Li$_2$S solution was injected into mesoporous carbon by a method in which mesoporous carbon prepared in Example 9 was impregnated with the Li$_2$S solution, and ethanol was removed to prepare a carbon/Li$_2$S nanocomposite. An amount of Li$_2$S was adjusted by the number of injection of the Li$_2$S solution. It can be seen through mass spectrometry before and after injection of Li$_2$S that, when the Li$_2$S solution was generally injected four times, an amount of Li$_2$S was about 28%. The carbon/Li$_2$S nanocomposite and a Teflon binder were mixed at a weight ratio of 28:5, rolled and dried to prepare an interlayer.

Example 8: Preparation of Mesoporous Silica/Sulfur Composite and Preparation of Interlayer Using the Same Mesoporous silica (Sigma-Aldrich) and sulfur were mixed at a weight ratio of 2:1 and put into a glass reaction container, and then gas was removed using a vacuum pump for 30 minutes. Afterward, the mixture was heated at 150° C. for 12 hours to inject sulfur into a mesopore.

FIG. 15 is a graph illustrating a pore size distribution of mesoporous silica (Sigma-Aldrich) and the mesoporous silica/sulfur nanocomposite. Referring to FIG. 15, it can be seen that a pore diameter significantly decreased after injection of sulfur. Also, it can be seen through thermogravimetric analysis (TGA) that a content of sulfur in the mesoporous silica/sulfur nanocomposite is about 34.45%. The mesoporous silica/sulfur nanocomposite and a Teflon binder were mixed at a weight ratio of 3:1, rolled and dried to prepare an interlayer.

Example 9: Manufacture of Lithium-Sulfur Battery Including Carbon/Sulfur Composite Interlayer 70 wt % sulfur (Sigma-Aldrich, 99.9%) as a positive electrode active material, 20 wt % polyethylene oxide (Sigma-Aldrich, 99.9%) as a binder and 10 wt % Ketjenblack (Ketjenblack EC-600JD, Akzo Nobel) as a conductive material were mixed for 12 hours or more and then dispersed in an acetonitrile solvent to prepare a positive electrode active material layer composition.

The composition thus prepared was applied to carbon-coated aluminum foil, vacuum-dried and rolled to prepare a positive electrode.

A mixed solution of methoxyethane/diglyme/1,3-dioxolane (a volume ratio of 60/20/20) in which LiN(SO$_2$CF$_3$)$_2$ and LiNO$_3$ were dissolved at concentrations of 1 M and 0.3 M, respectively, was used as an electrolyte solution.

The prepared positive electrode, the interlayer according to Example 6, a separator, lithium foil as a negative electrode and the prepared electrolyte solution were used to manufacture a lithium-sulfur battery. The interlayer was located between the positive electrode and the separator. An amount of sulfur in the positive electrode was 2.50 mg per unit area (cm$^2$), and an amount of sulfur in the interlayer was 1.25 mg per unit area (cm$^2$). The lithium-sulfur battery thus manufactured was discharged at constant current (0.1 Crate) until 1.8 V. FIG. 16 is a graph illustrating a measurement result thereof.

Example 10: Manufacture of Lithium-Sulfur Battery Including Carbon/Li$_2$S Composite Interlayer A lithium-sulfur battery was manufactured in the same manner as in Example 9 except that a composition of an interlayer is different. The prepared positive electrode, the interlayer according to Example 7, a separator, lithium foil as a negative electrode and the prepared electrolyte solution were used to manufacture a lithium-sulfur battery. The interlayer was located between the positive electrode and the separator. An amount of sulfur in the positive electrode was 2.50 mg per unit area (cm$^2$), and an amount of Li$_2$S in the interlayer was 3.40 mg per unit area (cm$^2$). The lithium-sulfur battery thus manufactured was charged at constant current (0.1 Crate) up to 4.0 V, and then discharged until 1.8 V. FIG. 17 is a graph illustrating a measurement result thereof.

Example 11: Manufacture of Lithium-Sulfur Battery Including Mesoporous Silica/Sulfur Nanocomposite Interlayer A lithium-sulfur battery was manufactured in the same manner as in Example 9 except that a composition of an interlayer is different. The prepared positive electrode, the interlayer according to Example 8, a separator, lithium foil as a negative electrode and the prepared electrolyte solution were used to manufacture a lithium-sulfur battery. The interlayer was located between the positive electrode and the separator. An amount of sulfur in the positive electrode was 2.50 mg per unit area (cm$^2$), and an amount of sulfur in the interlayer was 1.10 mg per unit area (cm$^2$). The lithium-sulfur battery thus manufactured was discharged at constant current (0.1 Crate) until 1.8 V. A measurement result is shown in FIG. 18.

Comparative Example 3: Manufacture of Lithium-Sulfur Battery

A lithium-sulfur battery was manufactured in the same manner as in Example 9 except that there is no interlayer. The lithium-sulfur battery thus manufactured was discharged at constant current (0.1 Crate) until 1.8 V. FIG. 19 is a graph illustrating a measurement result thereof.

Evaluation Example 3: Evaluation of Capacity Per Unit Area of Lithium-Sulfur Battery FIG. 16 is a graph illustrating the discharge capacity per unit area of the lithium-sulfur battery according to Example 9. FIG. 19 is a graph illustrating the discharge capacity per unit area of the lithium-sulfur battery according to Comparative Example 3.

Comparing FIG. 16 and FIG. 19, it can be seen that discharge capacity per unit area increased about 103.7% in the case of the lithium-sulfur battery according to Example 9 compared to the lithium-sulfur battery according to Comparative Example 3.

Evaluation Example 4: Evaluation of Capacity Per Unit Area of Lithium-Sulfur Battery FIG. 17 is a graph illustrating the discharge capacity per unit area of the lithium-sulfur battery according to Example 10. Comparing FIG. 17 and FIG. 19, it can be seen that discharge capacity per unit area increased about 58.0% in the case of Example 10 compared to Comparative Example 3.

Evaluation Example 5: Evaluation of Capacity Per Unit Area of Lithium-Sulfur Battery FIG. 18 is a graph illustrating the discharge capacity per unit area of the lithium-sulfur battery according to Example 11. Comparing FIG. 18 and FIG. 19, it can be seen that discharge capacity per unit area increased about 62% in the case of Example 11 compared to Comparative Example 3.

As described above, it can be seen that energy density and discharge capacity of the lithium-sulfur battery according to the present invention in which an interlayer, in which sulfur particles or lithium sulfide particles are injected into a pore of a support using porous carbon or porous silica as a support, is introduced into an electrolyte region of a lithium-sulfur battery increased compared to a lithium-sulfur battery without an interlayer.

Example 12: Preparation of Separator Supporting $Li_2S$ 0.3 g of $Li_2S$ was dissolved in 10 mL of anhydrous ethanol in a glove box, and then a glass fiber separator was impregnated with the resulting solution for about 3 hours. Ethanol was removed, and then a separator supporting $Li_2S$ was prepared. An electron microscope image of the separator supporting $Li_2S$ is shown in FIG. 20.

Example 13: Preparation of Separator Supporting Sulfur 0.48 g of sulfur was dissolved in 15 mL of carbon disulfide ($CS_2$) in a glove box, and then a glass fiber separator was impregnated with the resulting solution for about 3 hours. $CS_2$ was removed, and then a separator supporting sulfur was prepared. An electron microscope image of the separator supporting sulfur is shown in FIG. 21.

Example 14: Manufacture of Lithium-Sulfur Battery 60 wt % sulfur (Sigma-Aldrich, 99.9%) as a positive electrode active material, 20 wt % polyethylene oxide (Sigma-Aldrich, 99.9%) as a binder and 20 wt % Ketjenblack (Ketjenblack EC-600JD, Akzo Nobel) as a conductive material were mixed for 12 hours or more, and then dispersed in an acetonitrile solvent to prepare a positive electrode active material layer composition. The composition thus prepared was applied to carbon-coated aluminum foil, vacuum-dried, and rolled to prepare a positive electrode.

A mixed solution of dimethoxyethane/diglyme/1,3-dioxolane (a volume ratio of 6/2/2) in which $LiN(SO_2CF_3)_2$ and $LiNO_3$ were dissolved at concentrations of 1 M and 0.3 M, respectively, was used as an electrolyte solution. The prepared positive electrode, the separator according to Example 12, lithium foil as a negative electrode, and the prepared electrolyte solution were used to manufacture a lithium-sulfur battery.

An amount of sulfur in the positive electrode was 1.9 mg per unit area ($cm^2$), and an amount of $Li_2S$ in the separator was 3.3 mg per unit area ($cm^2$). The manufactured lithium-sulfur battery was charged at constant current (0.1 Crate) up to 4.0 V, and then discharged until 1.8 V. A measurement result is shown in FIG. 22.

Example 15: Manufacture of Lithium-Sulfur Battery 60 wt % sulfur (Sigma-Aldrich, 99.9%) as a positive electrode active material, 20 wt % polyethylene oxide (Sigma-Aldrich, 99.9%) as a binder and 20 wt % Ketjenblack (Ketjenblack EC-600JD, Akzo Nobel) as a conductive material were mixed for 12 hours or more, and then dispersed in an acetonitrile solvent to prepare a positive electrode active material layer composition. The composition thus prepared was applied to carbon-coated aluminum foil, vacuum-dried, and rolled to prepare a positive electrode.

A mixed solution of dimethoxyethane/diglyme/1,3-dioxolane (a volume ratio of 6/2/2) in which $LiN(SO_2CF_3)_2$ and $LiNO_3$ were dissolved at concentrations of 1 M and 0.3 M, respectively, was used as an electrolyte solution. The prepared positive electrode, the separator according to Example 13, lithium foil as a negative electrode, and the prepared electrolyte solution were used to manufacture a lithium-sulfur battery. An amount of sulfur in the positive electrode was 1.9 mg per unit area ($cm^2$), and an amount of sulfur in the separator was 1.9 mg per unit area ($cm^2$). The manufactured lithium-sulfur battery was discharged at constant current (0.1 Crate) until 1.8 V. A measurement result is shown in FIG. 23.

Comparative Example 4: Manufacture of Lithium-Sulfur Battery

A lithium-sulfur battery was manufactured in the same manner as in Example 14 except that a pure glass fiber separator was used between a positive electrode and a negative electrode of Example 12. An amount of sulfur in the positive electrode was 1.9 mg per unit area. The manufactured lithium-sulfur battery was discharged at constant current (0.1 Crate) until 1.8 V. A measurement result is shown in FIG. 24.

Evaluation Example 6: Evaluation of Capacity Per Unit Area of Lithium-Sulfur Battery FIG. 22 is a graph illustrating the discharge capacity per unit area of the lithium-sulfur battery according to Example 14. FIG. 24 is a graph illustrating the discharge capacity per unit area of the lithium-sulfur battery according to Comparative Example 4.

Comparing FIG. 22 and FIG. 24, it can be seen that discharge capacity per unit area increased about 20.8% in the case of Example 14 compared to Comparative Example 4. Therefore, it can be seen that the lithium-sulfur battery according to Example 14 exhibits excellent discharge capacity.

Evaluation Example 7: Evaluation of Capacity Per Unit Area of Lithium-Sulfur Battery FIG. 23 is a graph illustrating the discharge capacity per unit area of the lithium-sulfur battery according to Example 15.

Comparing FIG. 23 and FIG. 24, it can be seen that the discharge capacity per unit area increased about 94% in the case of Example 15 compared to Comparative Example 4. Therefore, it can be seen that the lithium-sulfur battery according to Example 15 exhibits excellent discharge capacity.

As described above, the lithium-sulfur battery according to the present invention including a separator which supports elemental sulfur or lithium sulfide has advantages in which energy density and discharge capacity are increased compared to a lithium-sulfur battery using a separator which does not support elemental sulfur or lithium sulfide.

While the present invention has been described with reference to exemplary embodiments, it should be interpreted that the present invention is not limited thereto and various changes and modifications may be made by those skilled in the art of the present invention without departing from the spirit and scope of the present invention as defined by the appended claims.

The invention claimed is:

1. A lithium sulfur battery, comprising:
a positive electrode including a conductive material; a lithium metal negative electrode;
a separator located between the positive electrode and the negative electrode; and
an electrolyte including a nonaqueous organic solvent and a lithium salt between the positive electrode and the negative electrode,
wherein solid sulfur is introduced into an electrolyte solution region between the positive electrode and the negative electrode, and the solid sulfur introduced into the electrolyte region is added to an electrolyte solution so that the solid sulfur is dispersed in the electrolyte solution.

2. A lithium-sulfur battery, comprising:
a positive electrode including a conductive material;
a lithium metal negative electrode; and
an electrolyte including a lithium salt and a nonaqueous organic solvent between the positive electrode and the negative electrode,
wherein an interlayer containing elemental sulfur ($S_8$) or lithium sulfide ($Li_2S$) is included in an electrolyte region between the positive electrode and the negative electrode, and the interlayer is a composite film prepared by mixing carbon or nonconductive oxide particles, elemental sulfur particles or lithium sulfide particles, and a binder.

3. The lithium-sulfur battery according to claim 1, wherein the positive electrode includes solid sulfur or a carbon/sulfur composite.

4. The lithium-sulfur battery according to claim 1, wherein the conductive material of the positive electrode includes a carbon-based material.

5. The lithium-sulfur battery according to claim 1, wherein the solid sulfur introduced into the electrolyte region is located in at least one position among between the positive electrode and the separator, between the negative electrode and the separator, on a surface of the separator, on a surface of the positive electrode, and on a surface of the negative electrode.

6. The lithium-sulfur battery according to claim 2, further comprising a separator in the electrolyte region between the positive electrode and the negative electrode, wherein the interlayer is placed between the positive electrode and the separator.

7. The lithium-sulfur battery according to claim 2, wherein the positive electrode includes elemental sulfur or lithium sulfide as an active material.

8. The lithium-sulfur battery according to claim 2, wherein the carbon or nonconductive oxide particle is non-porous materials.

9. The lithium-sulfur battery according to claim 2, wherein the carbon or nonconductive oxide particle is porous materials.

10. The lithium-sulfur battery according to claim 2, wherein the interlayer is prepared in a film form by mixing porous support particles in which elemental sulfur or lithium sulfide particles are incorporated into the pores of the carbon or nonconductive oxide with a binder.

11. The lithium-sulfur battery according to claim 10, wherein the porous support particles have a pore diameter of 1 nm to 10 μm.

12. The lithium-sulfur battery according to claim 2, wherein the nonconductive oxide includes a nonconductive metal oxide.

13. The lithium-sulfur battery according to claim 2, wherein the nonconductive oxide includes silica.

14. The lithium-sulfur battery according to claim 2, wherein the conductive material of the positive electrode includes a carbon-based material.

* * * * *

UNITED STATES PATENT AND TRADEMARK OFFICE
CERTIFICATE OF CORRECTION

PATENT NO. : 10,381,680 B2
APPLICATION NO. : 15/526047
DATED : August 13, 2019
INVENTOR(S) : Yong Ju Jung et al.

Page 1 of 1

It is certified that error appears in the above-identified patent and that said Letters Patent is hereby corrected as shown below:

On the Title Page

In Item (71), Applicant, "KOREA UNIVERSITY OF TECHNOLOGY AND EDUCATION INDUSTRY-UNIVERSITY COOPERATION FOUNDATION" should read -- J-INNOTECH CO., LTD, Asan-si (KR) --

Signed and Sealed this
First Day of October, 2019

Andrei Iancu
*Director of the United States Patent and Trademark Office*